(12) United States Patent
Yao et al.

(10) Patent No.: US 11,163,141 B2
(45) Date of Patent: Nov. 2, 2021

(54) FOLDED LENS SYSTEM WITH THREE REFRACTIVE LENSES

(71) Applicant: Apple Inc., Cupertino, CA (US)

(72) Inventors: Yuhong Yao, San Jose, CA (US);
Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 16/593,888

(22) Filed: Oct. 4, 2019

(65) Prior Publication Data

US 2020/0033565 A1 Jan. 30, 2020

Related U.S. Application Data

(63) Continuation of application No. 15/472,138, filed on Mar. 28, 2017, now Pat. No. 10,437,023.

(60) Provisional application No. 62/314,350, filed on Mar. 28, 2016, provisional application No. 62/334,403, filed on May 10, 2016.

(51) Int. Cl.
*G02B 13/00* (2006.01)
(52) U.S. Cl.
CPC ..... *G02B 13/0065* (2013.01); *G02B 13/0035* (2013.01)
(58) Field of Classification Search
CPC .............. G02B 13/0035; G02B 13/0065
See application file for complete search history.

(56) References Cited

U.S. PATENT DOCUMENTS

| 7,170,690 B2 * | 1/2007 | Ophey ................. G02B 15/142 359/676 |
| RE42,642 E | 8/2011 | Sato et al. |
| 8,817,393 B2 * | 8/2014 | Kwon ................ G02B 13/0045 359/764 |
| 9,316,810 B2 | 4/2016 | Mercado |

(Continued)

FOREIGN PATENT DOCUMENTS

| CN | 1940628 | 4/2007 |
| CN | 104898352 | 9/2015 |

(Continued)

OTHER PUBLICATIONS

Office Action from Chinese Application No. 201780014485.1, dated Mar. 30, 2020, (English Translation and Chinese Version), pp. 1-12.

(Continued)

*Primary Examiner* — Amy R Hsu
(74) *Attorney, Agent, or Firm* — Robert C. Kowert; Kowert, Hood, Munyon, Rankin & Goetzel, P.C.

(57) ABSTRACT

Compact folded lens systems are described that may be used in small form factor cameras. Lens systems are described that may include three lens elements with refractive power, with a light folding element such as a prism, located between a first lens element on the object side of the lens system and a second lens element, that redirects the light refracted from the first lens element from a first axis onto a second axis on which the other lens elements and a photosensor are arranged. The lens systems may include an aperture stop located behind the front vertex of the lens system, for example at the first lens element, and an optional infrared filter, for example located between the last lens element and a photosensor.

20 Claims, 17 Drawing Sheets

(56) References Cited

U.S. PATENT DOCUMENTS

| | | | |
|---|---|---|---|
| 2003/0160902 A1* | 8/2003 | Mihara | G02B 13/0065 |
| | | | 348/676 |
| 2004/0105025 A1 | 6/2004 | Scherling | |
| 2004/0257677 A1 | 12/2004 | Matsusaka | |
| 2007/0024739 A1* | 2/2007 | Konno | G02B 13/002 |
| | | | 348/337 |
| 2007/0070525 A1 | 3/2007 | Taniyama | |
| 2009/0179995 A1* | 7/2009 | Fukumoto | H04N 5/23267 |
| | | | 348/208.6 |
| 2009/0296238 A1* | 12/2009 | Kakuta | G02B 13/0065 |
| | | | 359/737 |
| 2010/0315521 A1* | 12/2010 | Kunishige | G11B 27/10 |
| | | | 348/220.1 |
| 2011/0141339 A1 | 6/2011 | Seo | |
| 2014/0111650 A1* | 4/2014 | Georgiev | H04N 5/2257 |
| | | | 348/159 |
| 2015/0042870 A1* | 2/2015 | Chan | G02B 7/102 |
| | | | 348/357 |
| 2015/0253543 A1* | 9/2015 | Mercado | G02B 13/0065 |
| | | | 348/370 |
| 2015/0253647 A1* | 9/2015 | Mercado | G02B 13/002 |
| | | | 348/373 |
| 2015/0316748 A1* | 11/2015 | Cheo | G02B 13/0075 |
| | | | 359/694 |
| 2016/0327773 A1* | 11/2016 | Choi | G02B 13/0065 |
| 2017/0023781 A1* | 1/2017 | Wang | G02B 15/1425 |
| 2017/0108670 A1* | 4/2017 | Ko | G02B 9/60 |

FOREIGN PATENT DOCUMENTS

| | | |
|---|---|---|
| JP | 2006078854 | 3/2006 |
| KR | 20160000759 | 1/2016 |
| WO | 2016011801 | 1/2016 |

OTHER PUBLICATIONS

International Search Report and Written Opinion form PCT/US2017/024574, dated Jun. 19, 2017, Apple Inc, pp. 1-15.

Examination Report from European Application No. 17715892.0-1020, dated Feb. 11, 2021, pp. 1-6.

\* cited by examiner

FOLDED LENS SYSTEM WITH THREE REFRACTIVE LENSES

PRIORITY INFORMATION

This application is a continuation of U.S. patent application Ser. No. 15/472,138, filed Mar. 28, 2017 which claims benefit of priority of U.S. Provisional Application Ser. No. 62/314,350, filed Mar. 28, 2016, and also claims benefit of priority of U.S. Provisional Application Ser. No. 62/334,403, filed May 10, 2016, the content of which are incorporated by reference herein in their entirety.

BACKGROUND

Technical Field

This disclosure relates generally to camera systems, and more specifically to compact lens systems for high-resolution, small form factor camera systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor (also referred to as an image sensor) with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Compact folded lens systems are described that may be used in small form factor cameras. Lens systems are described that may include three lens elements with refractive power, with a light folding element such as a prism located between a first lens element on the object side of the lens system and a second lens element that redirects the light refracted from the first lens element from a first axis onto a second axis on which the other lens elements and a photosensor are arranged. The lens systems may include an aperture stop located behind the front vertex of the lens system, for example at the first lens element, and an optional infrared filter, for example located between the last lens element and a photosensor of the camera.

Embodiments of the compact folded lens system may include three lens elements with refractive power and a light folding element such as a prism to fold the optical axis. Embodiments of the compact folded lens system may be configured to operate with a relatively narrow field of view and a 35 mm equivalent focal length ($f_{35mm}$) in the medium to long telephoto range. For example, some embodiments of the compact folded lens system may provide a 35 mm equivalent focal length in the range of 80-200 mm, with less than 6.5 mm of Z-height to fit in a wide variety of portable electronics devices.

Through proper arrangement in materials, power and radius of curvature of the three lens elements with power, embodiments of the compact folded lens are capable of capturing high resolution, high quality images at good brightness level. In some embodiments, a first lens element from the object side of the lens system has a convex object-side surface in the paraxial region, and a third lens element has a concave image-side surface in the paraxial region. In some embodiments, a first lens element from the object side of the lens system has a convex object-side surface in the paraxial region, and a third lens element has a concave image-side surface in the paraxial region and a convex object-side surface in the paraxial region (i.e., has a meniscus shape). In some embodiments, the first lens element is formed of an optical material with Abbe number Vd>40, and a second lens element is formed of an optical material with Abbe number Vd<30. In some embodiments, the first lens element is formed of an optical material with Abbe number Vd>45, and a second lens element is formed of an optical material with Abbe number Vd<35.

Figure 1A:
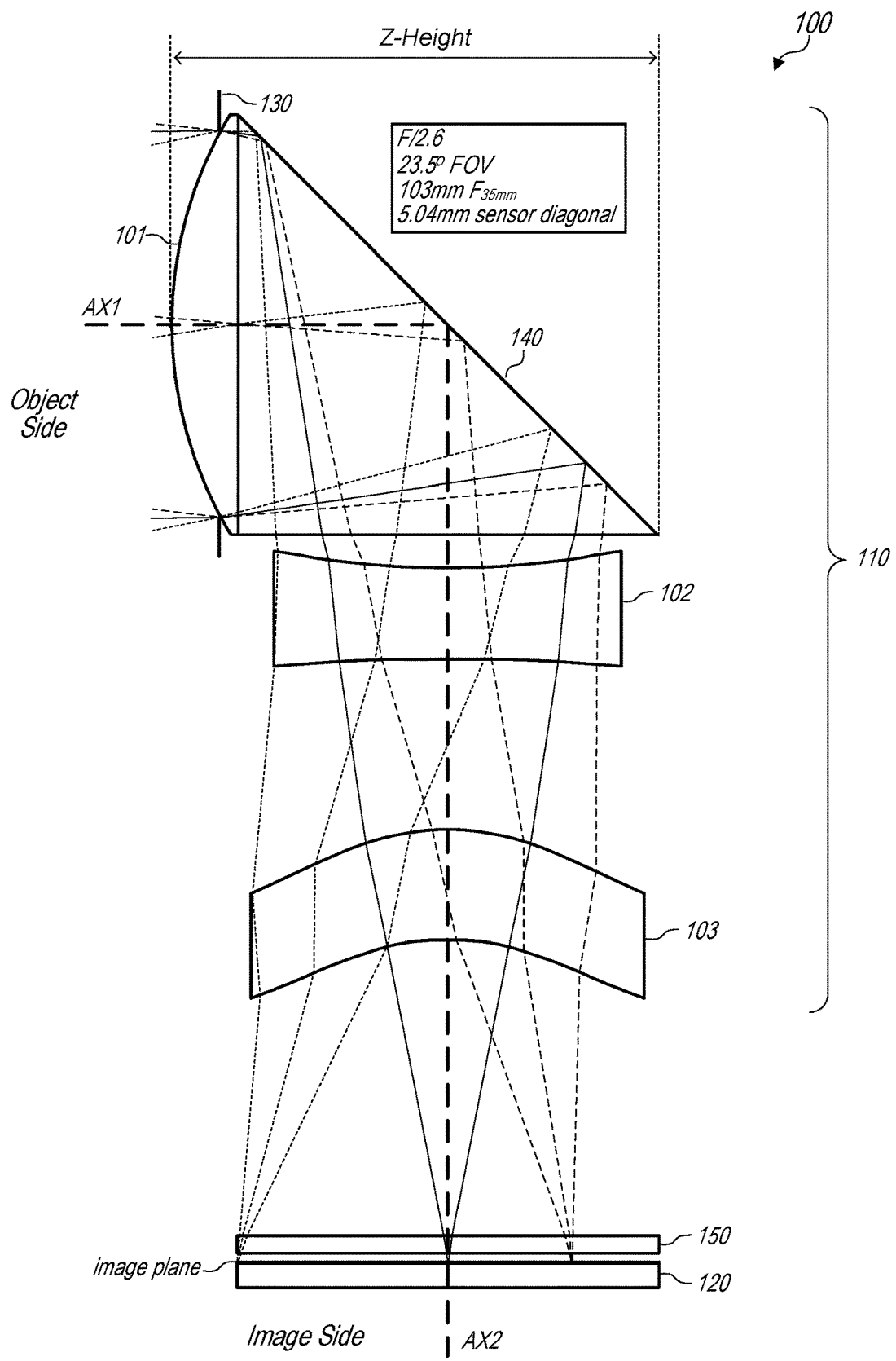
FIGS. 1A and 1B is a cross-sectional illustration of a compact camera including an example embodiment of a compact folded lens system with three lens elements and a light folding element that operates at F/2.6, with 23.5° full field of view (FOV).

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not necessarily imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a compact folded lens system including three lens elements with refractive power, with a light folding element such as a prism, located between a first lens element on the object side of the lens system and a second lens element, that redirects the light refracted from the first lens element from a first axis onto a second axis on which the other lens elements and a photosensor are arranged. The lens system may include an aperture stop, for example located at or behind the front vertex of the lens system, for example at the first lens element, and an optional infrared filter, for example located between the last lens element and the photosensor. The shapes, materials, and arrangements of the lens elements in the lens system may be selected to capture high resolution, high quality images.

Conventionally, compact imaging lenses can be designed with a non-folded optical axis that provide a 35 mm equivalent focal length ($f_{35mm}$) of 50 mm-70 mm. However, the lens brightness (related to the focal ratio, or F/#, of the lens system) and image quality of these conventional compact lens designs are typically limited by the constraint in thickness (Z dimension) of portable electronics devices. It is difficult to further increase the lens effective focal length of these conventional compact lens designs due to the scaling relationship with respect to the lens dimensions. To overcome this limitation, a folding-prism or mirror may be used in embodiments to relieve the constraint in the Z dimension of the lens system.

Figure 12:
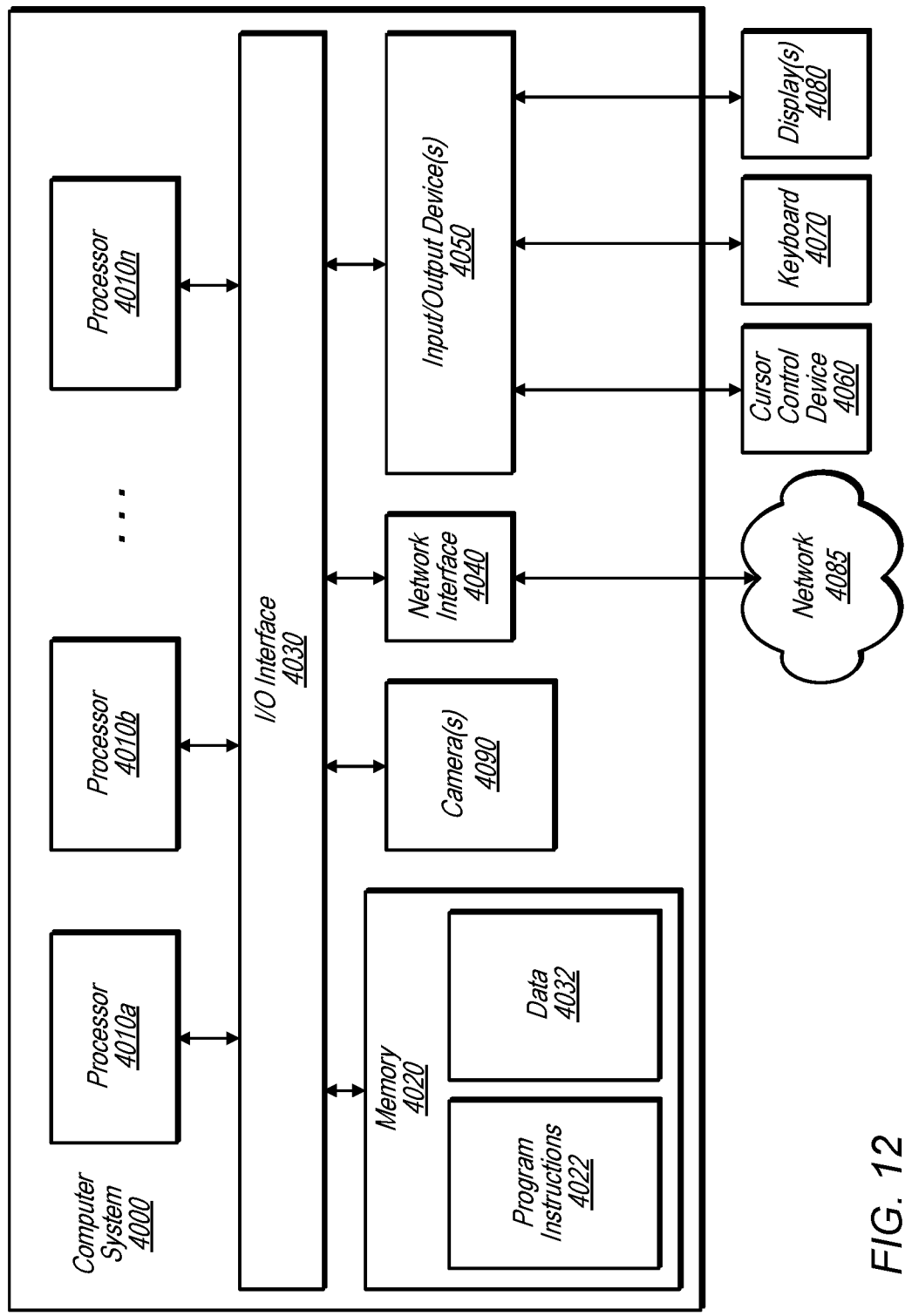
FIG. 12 illustrates an example computer system that may be used in embodiments.

Embodiments of the compact folded lens systems as described herein may provide high resolution, high quality imaging for small form factor cameras. Using an embodiment of the compact lens system, a camera may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. FIG. 12 illustrates an example device that may include one or more small form factor cameras that use embodiments of the compact folded lens systems as described herein. However, note that aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications.

Folded Lens Systems with Three Lens Elements

FIGS. 1A through 8B show several embodiments of compact cameras with compact folded lens systems with three lens elements and a light folding element such as a prism that "folds" the optical axis of the lens system. A compact camera including an embodiment of the compact folded lens systems as illustrated in FIGS. 1A through 8B may, for example, be implemented in portable electronic devices such as mobile phones and tablets. The lens system and/or camera may also include an aperture stop, an optional infrared (IR) filter, and a photosensor. The compact folded lens systems as illustrated in FIGS. 1A through 8B may be configured to operate with a relatively narrow field of view and a 35 mm equivalent focal length ($f_{35mm}$) in the medium to long telephoto range. Compact cameras including the compact folded lens systems as illustrated in FIGS. 1A through 8B may, for example, be used stand-alone for telephoto photography, or can be paired with a wide-angle imaging lens in a dual-prime configuration to enable effective optical zoom for portable electronic devices.

Embodiments of the compact folded lens system as illustrated in FIGS. 1A through 8B may include three lens elements with refractive power and a light folding element such as a prism to fold the optical axis. Embodiments of the compact folded lens system as illustrated in FIGS. 1A through 8B may provide a 35 mm equivalent focal length in the range of 80-200 mm and less than 6.5 mm of Z-height to fit in a wide variety of portable electronics devices. With proper arrangement in materials, power and radius of curvature of the three lens elements with power, embodiments of the compact folded lens system as illustrated in FIGS. 1A through 8B are capable of capturing high resolution, high quality images at good brightness level.

Embodiments of the compact folded lens system as illustrated in FIGS. 1A through 8B include three lens elements with refractive power and a folding element such as a prism, in order from the object side to the image side of the lens system: a first lens element (lens 1) with positive refractive power, a folding element such as a prism to fold the optical axis from AX1 to AX2, a second lens element (lens 2) with negative refractive power, and a third lens element (lens 3) with refractive power. An aperture stop may be located between the object side of the lens system and the folding element for controlling the brightness of the optical system. In some embodiments, the lens system or camera includes an infrared (IR) filter to reduce or eliminate interference of environmental noises on the image sensor (also referred to herein as a photosensor or sensor). In some embodiments, the photosensor may be shifted along AX2 to allow refocusing of the lens system in between Infinity conjugate and Macro conjugate, for example for autofocus applications. Lens 2 and lens 3 may be round/circular optical lenses, or may have a shape other than circular (e.g., rectangular or square, hexagonal, etc.) to reduce the camera module Z height.

In embodiments of the compact folded lens system as illustrated in FIGS. 1A through 8B, one or more of the following requirements may be satisfied, for example to facilitate correction of aberrations across the field of view (FOV) for the lens system:

Lens 1 has a convex object-side surface in the paraxial region.

Lens 3 has a concave image-side surface in the paraxial region and a convex object-side surface in the paraxial region (i.e., lens 3 has a meniscus shape).

In various embodiments, the other lens surfaces of lenses 1 through 3 may be concave, convex, or flat/plano (e.g., the lenses may be plano-concave or plano-convex lenses) in the paraxial region.

In some embodiments, one or more of the following relationships may be met:

$0.5 < |f/f1| < 2$ $0.4 < |f/f2| < 2.5$ $0.5 < |R3f/R3r| < 1.5$ where f is effective focal length of the lens system, f1 is focal length of lens 1, f2 is focal length of lens 2, R3f is radius of curvature of the object-side surface of lens 3, and R3r is radius of curvature of the image side surface of lens 3.

In some embodiments, at least one of the six lens surfaces may be aspheric.

In some embodiments, at least one of the lens elements is made of lightweight polymer or plastic material.

In some embodiments, lens 1 is formed of an optical material with Abbe number Vd>45, and lens 2 is formed of an optical material with Abbe number Vd<35. The material and power configurations of lenses 1 and 2 may, for example, be selected for reduction of chromatic aberrations.

In some embodiments lens 3 is formed of an optical material with no limit in Abbe number.

As shown in the example embodiments in FIGS. 1A-1B, 3A-3B, 7A-7B, and 8A-8B, in some embodiments of a camera including compact folded lens system as illustrated in FIGS. 1A through 8B, the photosensor may be moved on one or more axes relative to the lens system to adjust focus of the camera. Alternatively, in some embodiments, the lens system may be moved relative to the photosensor to adjust focus. FIGS. 1A, 3A, 7A, and 8A correspond to the camera focused at a first position (infinity conjugate), and FIGS. 1B, 3B, 7B, and 8B correspond to the camera focused at a second position (e.g., macro conjugate, 500 mm in FIG. 1B). While the focus positions are shown as examples, note that the camera may be focused at other positions in some embodiments.

As shown in the example embodiments in FIGS. 1A-1B, 2, 4, 5, 6, 7A-7B, and 8A-8B, in some embodiments of a compact folded lens system as described herein, the image side surface of the first lens element (lens 1) may be flat/plano (e.g., lens 1 may be plano-convex), and the image side surface of lens 1 may be at/in contact with the object side surface of the light folding prism to effectively form a single combined unit or element. The lens 1 and prism elements may be composed of the same type of material (e.g., a plastic material) or of different types of materials. In some embodiments, the lens 1 and prism elements may be cemented. Alternatively, the lens 1 and prism elements may be composed of the same type of material (e.g., a plastic material), and may be molded as a single combined unit or element. However, in some embodiments, for example as shown in FIGS. 3A-3B, the image side surface of lens 1 may be convex, concave, or flat-plano, and lens 1 and the folding element (prism) may be air-spaced.

Example Lens System 110

Figure 1B:
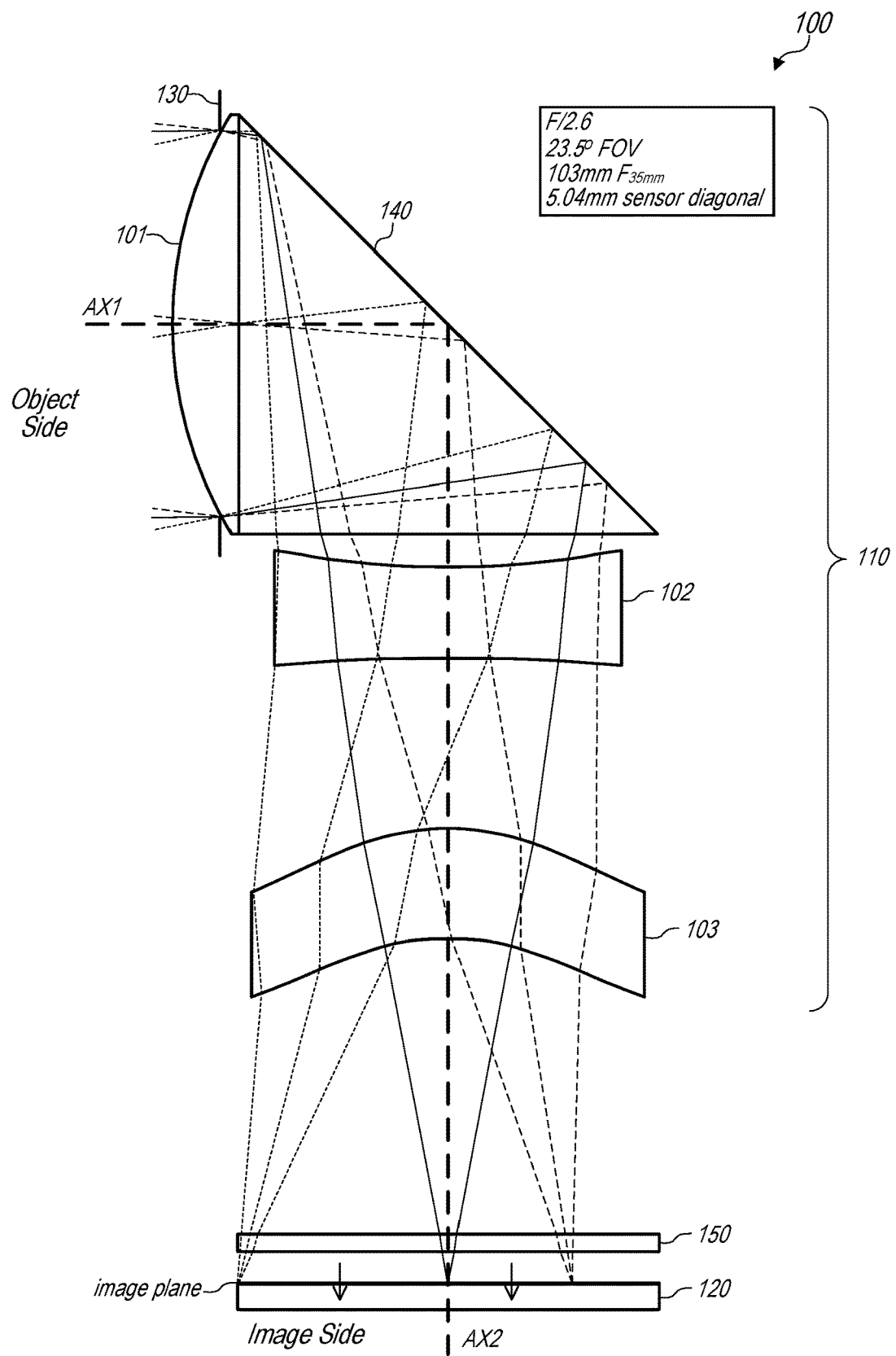

FIGS. 1A and 1B show a camera 100 that includes an example embodiment of a compact folded lens system 110 that operates at F/2.6, with 23.5° full FOV. Camera 100 includes a 5.04 mm diagonal photosensor 120. Lens system 110 includes three lens elements with refractive power and a folding element such as a prism, in order from the object side to the image side of the lens system: a first lens element 101 with positive refractive power, a folding element 140 such as a prism to fold the optical axis from AX1 to AX2, a second lens element 102 with negative refractive power, and a third lens element 103 with refractive power. An aperture stop 130 may be located between the object side of the lens system 110 and the folding element 140, for example at or near the object side surface of lens element 101, for controlling the brightness of the optical system. In some embodiments, the lens system 110 or camera 100 includes an IR filter 150 to reduce or eliminate interference of environmental noises on the photosensor 120.

Tables 1-5 correspond to an embodiment of a lens system 110 as illustrated in FIGS. 1A and 1B, and provide example values for various optical and physical parameters of the lens system 110 and camera 100 of FIGS. 1A and 1B. The effective focal length (EFL) of the lens system 110 is 12 mm. Given the EFL and photosensor size, the 35 mm equivalent focal length of the camera 100 may be 103 mm. In some embodiments, the camera 100/lens system 110 has the capability of autofocusing from 500 mm to Infinity conjugates.

As shown in FIGS. 1A-1B, in some embodiments the photosensor 120 may be moved on one or more axes relative to the lens system 110 to adjust focus of the camera 100. FIG. 1A corresponds to the camera 100 focused at a first position (infinity conjugate), and FIG. 1B corresponds to the camera 100 focused at a second position (500 mm in FIG.

1B). While the focus positions are shown as examples, note that the camera 100 may be focused at other positions in some embodiments.

The modulation transfer functions (MTFs) for lens system 110 when focused at Infinity and Macro (500 mm) conjugates, at all fields and both conjugates, are higher than 0.5 at 125 line pairs (lp)/mm and higher than 0.3 at 250 lp/mm; the lens system 110 provides good contrast for high-resolution imaging. At both conjugates, on-axis and off-axis aberrations for lens system 110 are well balanced across the FOV. At both conjugates, optical distortion across the FOV is controlled within 2%, while field curvature and astigmatism are well balanced across the FOV.

In some embodiments, Z-height of the example lens system 110, as defined from the front vertex of lens element 101 to the rear vertex of the folding element 140, may be 5.8 mm. The lens system 110 is able to fit into a wide variety of portable electronic devices including but not limited to smart phones and tablets.

Example Lens System 210

Figure 2:
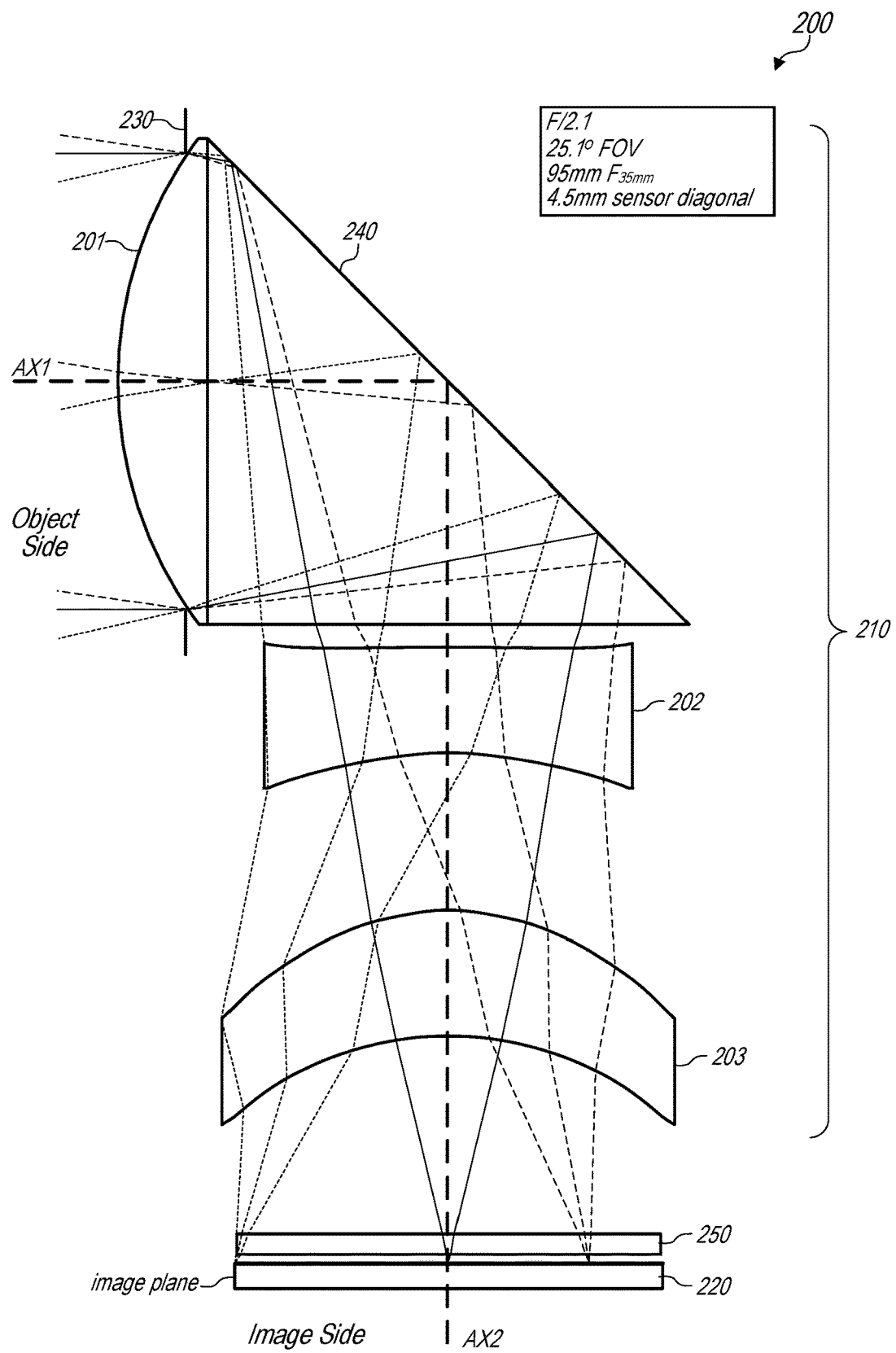
FIG. 2 shows a camera that includes an example embodiment of a compact folded lens system with three lens elements and a light folding element that operates at F/2.1, with 25.1° full FOV.
Figure 3A:
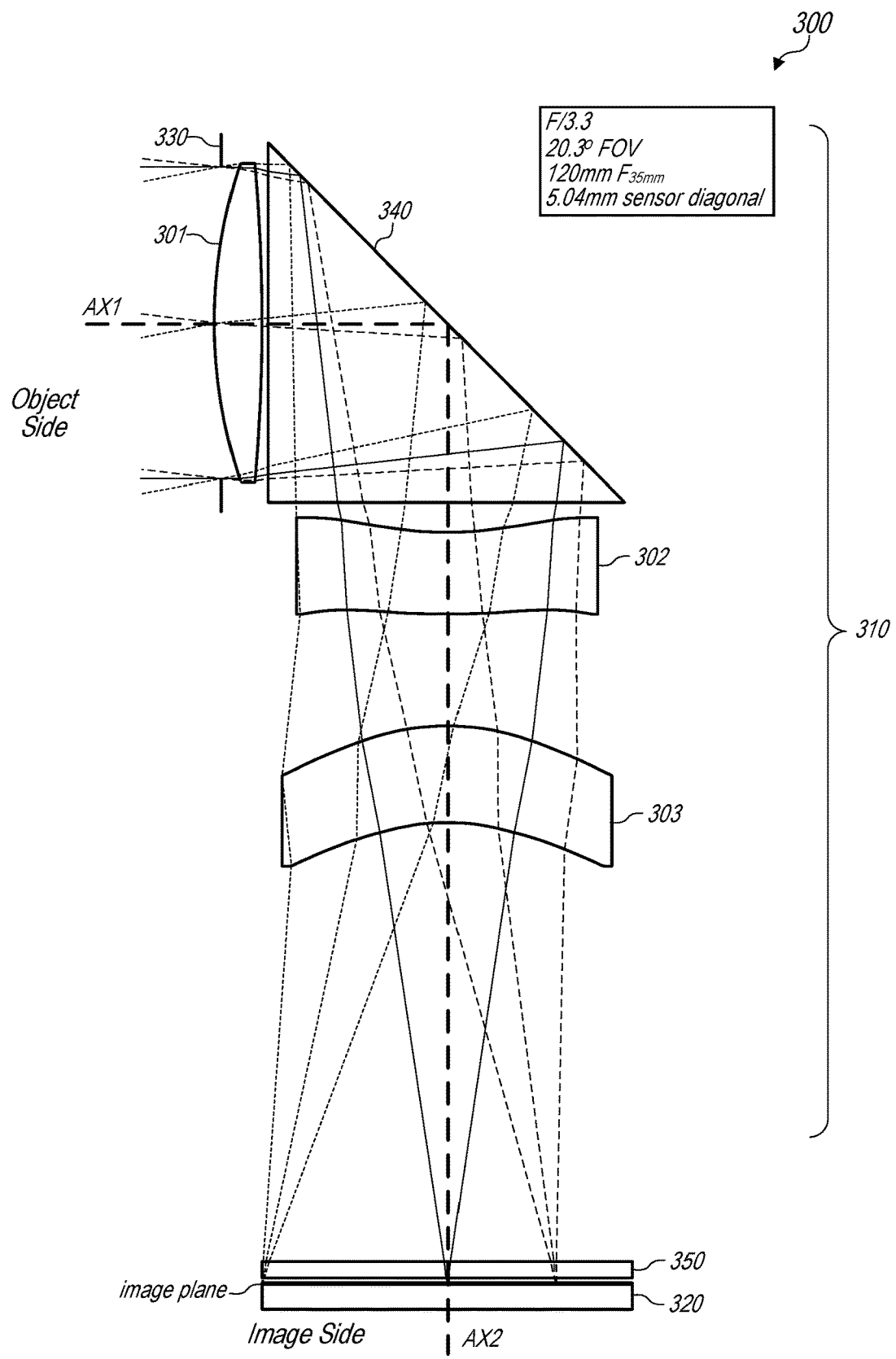
FIGS. 3A and 3B show a camera that includes an example embodiment of a compact folded lens system with three lens elements and a light folding element that operates at F/3.3, with 20.3° full FOV.
Figure 3B:
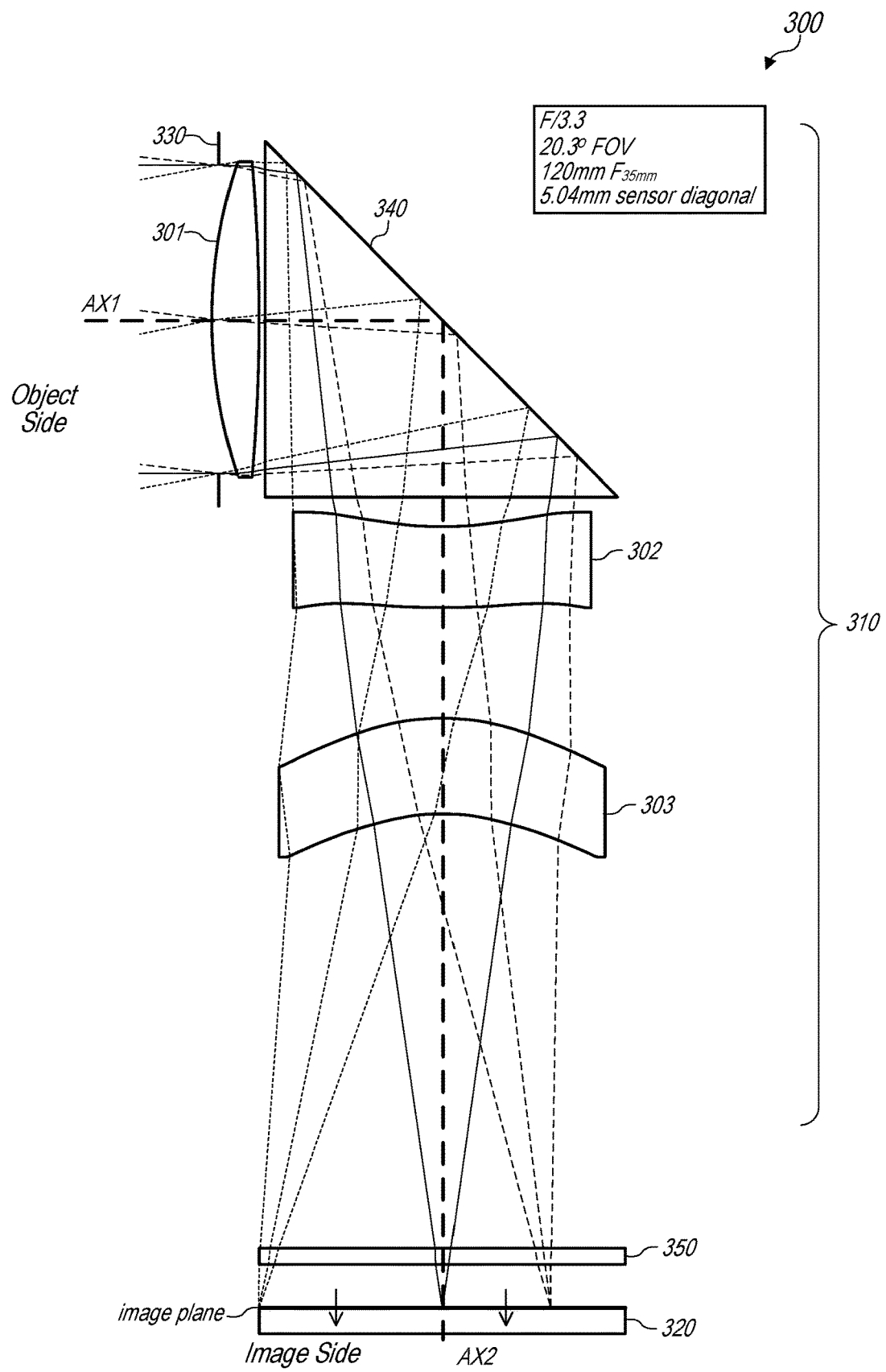

FIG. 2 shows a camera 200 that includes an example embodiment of a compact folded lens system 210 that operates at F/2.1, with 25.1° full FOV. Camera 200 includes a 4.5 mm diagonal photosensor 220. Lens system 210 includes three lens elements with refractive power and a folding element such as a prism, in order from the object side to the image side of the lens system: a first lens element 201 with positive refractive power, a folding element 240 such as a prism to fold the optical axis from AX1 to AX2, a second lens element 202 with negative refractive power, and a third lens element 203 with refractive power. An aperture stop 230 may be located between the object side of the lens system 210 and the folding element 240, for example at or near the object side surface of lens element 201, for controlling the brightness of the optical system. In some embodiments, the lens system 210 or camera 200 includes an IR filter 250 to reduce or eliminate interference of environmental noises on the photosensor 220.

Tables 6-9 correspond to an embodiment of a lens system 210 as illustrated in FIG. 2, and provide example values for various optical and physical parameters of the lens system 210 and camera 200 of FIG. 2. The effective focal length (EFL) of the lens system 210 is 10 mm. Given the EFL and photosensor size; the 35 mm equivalent focal length of the camera 200 may be 95 mm. While not shown in FIG. 2, in some embodiments, the camera 200/lens system 210 has the capability of autofocusing from Macro to Infinity conjugates.

The modulation transfer function (MTF) for lens system 210 is higher than 0.5 at 125 lp/mm and higher than 0.3 at 250 lp/mm; the lens system 210 provides good contrast for high-resolution imaging. On-axis and off-axis aberrations for lens system 210 are well balanced across the FOV. Optical distortion across the FOV is controlled within 2%, while field curvature and astigmatism are well balanced across the FOV.

In some embodiments, Z-height of the example lens system 210, as defined from the front vertex of lens element 201 to the rear vertex of the folding element 240, may be 6 mm. The lens system 210 is able to fit into a wide variety of portable electronic devices including but not limited to smart phones and tablets.

Example Lens System 310

FIGS. 3A and 3B show a camera 300 that includes an example embodiment of a compact folded lens system 310 that operates at F/3.3, with 20.3° full FOV. Camera 300 includes a 5.04 mm diagonal photosensor 320. Lens system 310 includes three lens elements with refractive power and a folding element such as a prism, in order from the object side to the image side of the lens system: a first lens element 301 with positive refractive power, a folding element 340 such as a prism to fold the optical axis from AX1 to AX2, a second lens element 302 with negative refractive power, and a third lens element 303 with refractive power. As shown in FIGS. 3A and 3B, the image side surface of lens element 301 is convex, and there is air space between lens element 301 and the object side surface of the folding element 340. An aperture stop 330 may be located between the object side of the lens system 310 and the folding element 340, for example at or near the front vertex of lens element 301, for controlling the brightness of the optical system. In some embodiments, the lens system 310 or camera 300 includes an IR filter 350 to reduce or eliminate interference of environmental noises on the photosensor 320.

Tables 10-14 correspond to an embodiment of a lens system 310 as illustrated in FIGS. 3A and 3B, and provide example values for various optical and physical parameters of the lens system 310 and camera 300 of FIGS. 3A and 3B. The effective focal length (EFL) of the lens system 310 is 14 mm. Given the EFL and photosensor size, the 35 mm equivalent focal length of the camera 300 may be 120 mm. In some embodiments, the camera 300/lens system 310 has the capability of autofocusing from Macro to Infinity conjugates.

As shown in FIGS. 3A-3B, in some embodiments the photosensor 320 may be moved on one or more axes relative to the lens system 310 to adjust focus of the camera 300. FIG. 3A corresponds to the camera 300 focused at a first position (infinity conjugate), and FIG. 3B corresponds to the camera 300 focused at a second position (Macro conjugate). While the focus positions are shown as examples, note that the camera 300 may be focused at other positions in some embodiments.

The modulation transfer functions (MTFs) for lens system 310 when focused at Infinity and Macro conjugates, at all fields and both conjugates, are close to diffraction limited; the lens system 310 provides good contrast for high-resolution imaging. At both conjugates, on-axis and off-axis aberrations for lens system 310 are well balanced across the FOV. At both conjugates, optical distortion across the FOV is controlled within 2%, while field curvature and astigmatism are well balanced across the FOV.

In some embodiments, Z-height of the example lens system 310, as defined from the front vertex of lens element 301 to the rear vertex of the folding element 340, may be 5.6 mm. The lens system 310 is able to fit into a wide variety of portable electronic devices including but not limited to smart phones and tablets.

Example Lens System 410

Figure 4:
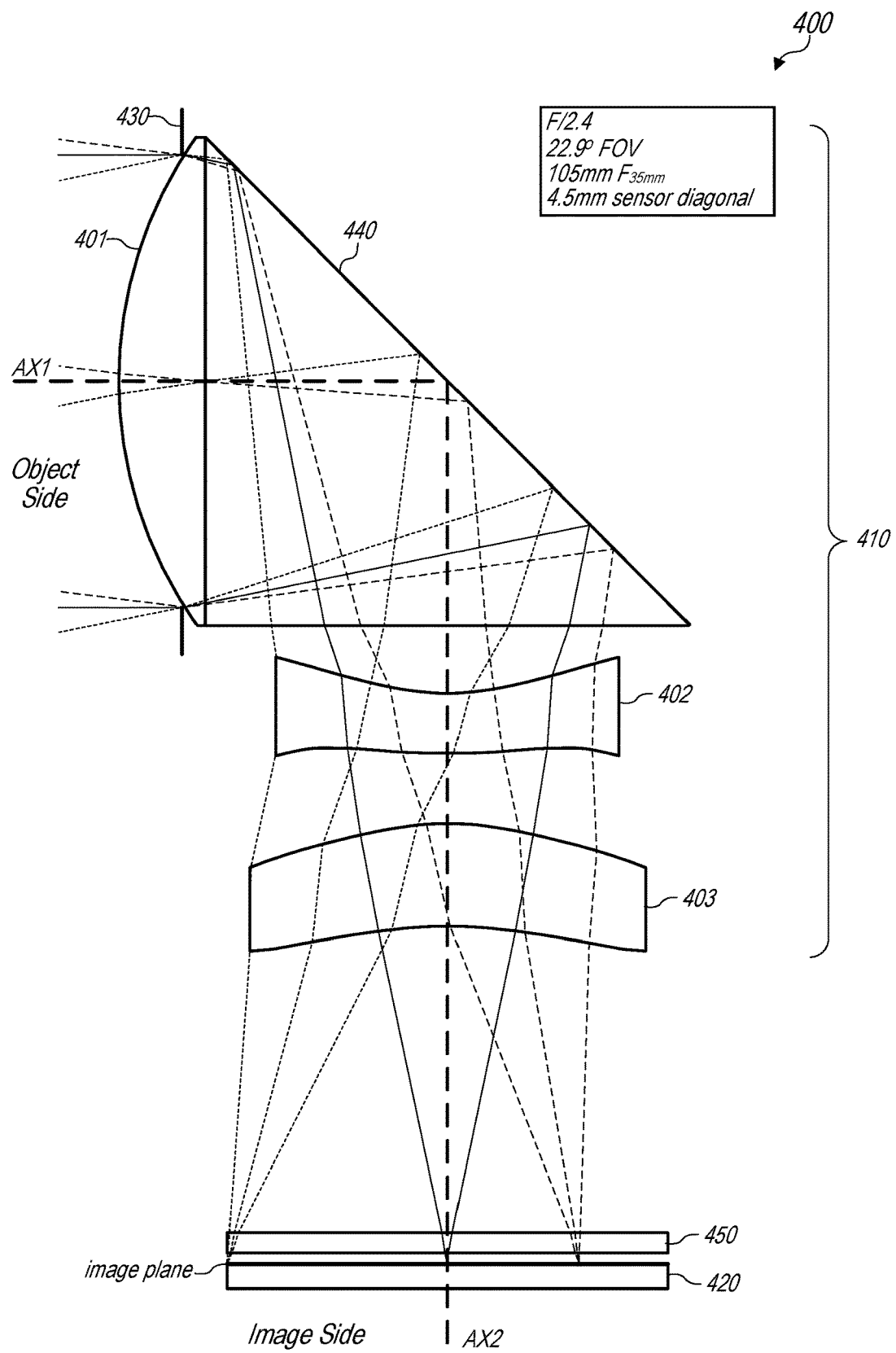
FIG. 4 shows a camera that includes an example embodiment of a compact folded lens system with three lens elements and a light folding element that operates at F/2.4, with 22.9° full FOV.

FIG. 4 shows a camera 400 that includes an example embodiment of a compact folded lens system 410 that operates at F/2.4, with 22.9° full FOV. Camera 400 includes a 4.5 mm diagonal photosensor 420. Lens system 410 includes three lens elements with refractive power and a folding element such as a prism, in order from the object side to the image side of the lens system: a first lens element 401 with positive refractive power, a folding element 440 such as a prism to fold the optical axis from AX1 to AX2, a second lens element 402 with negative refractive power, and a third lens element 403 with refractive power. An aperture stop 430 may be located between the object side of the lens system 410 and the folding element 440, for example at or near the object side surface of lens element 401, for controlling the brightness of the optical system. In some embodiments, the lens system 410 or camera 400 includes an IR filter 450 to reduce or eliminate interference of environmental noises on the photosensor 420.

Tables 15-18 correspond to an embodiment of a lens system 410 as illustrated in FIG. 4, and provide example values for various optical and physical parameters of the lens system 410 and camera 400 of FIG. 4. The effective focal length (EFL) of the lens system 410 is 11 mm. Given the EFL and photosensor size, the 35 mm equivalent focal length of the camera 400 may be 105 mm. While not shown in FIG. 4, in some embodiments, the camera 400/lens system 410 has the capability of autofocusing from Macro to Infinity conjugates.

On-axis and off-axis aberrations for lens system 410 are well balanced across the FOV. Optical distortion across the FOV is controlled within 2%, while field curvature and astigmatism are well balanced across the FOV.

In some embodiments, Z-height of the example lens system 410, as defined from the front vertex of lens element 401 to the rear vertex of the folding element 440, may be 5.85 mm. The lens system 410 is able to fit into a wide variety of portable electronic devices including but not limited to smart phones and tablets.

Example Lens System 510

Figure 5:
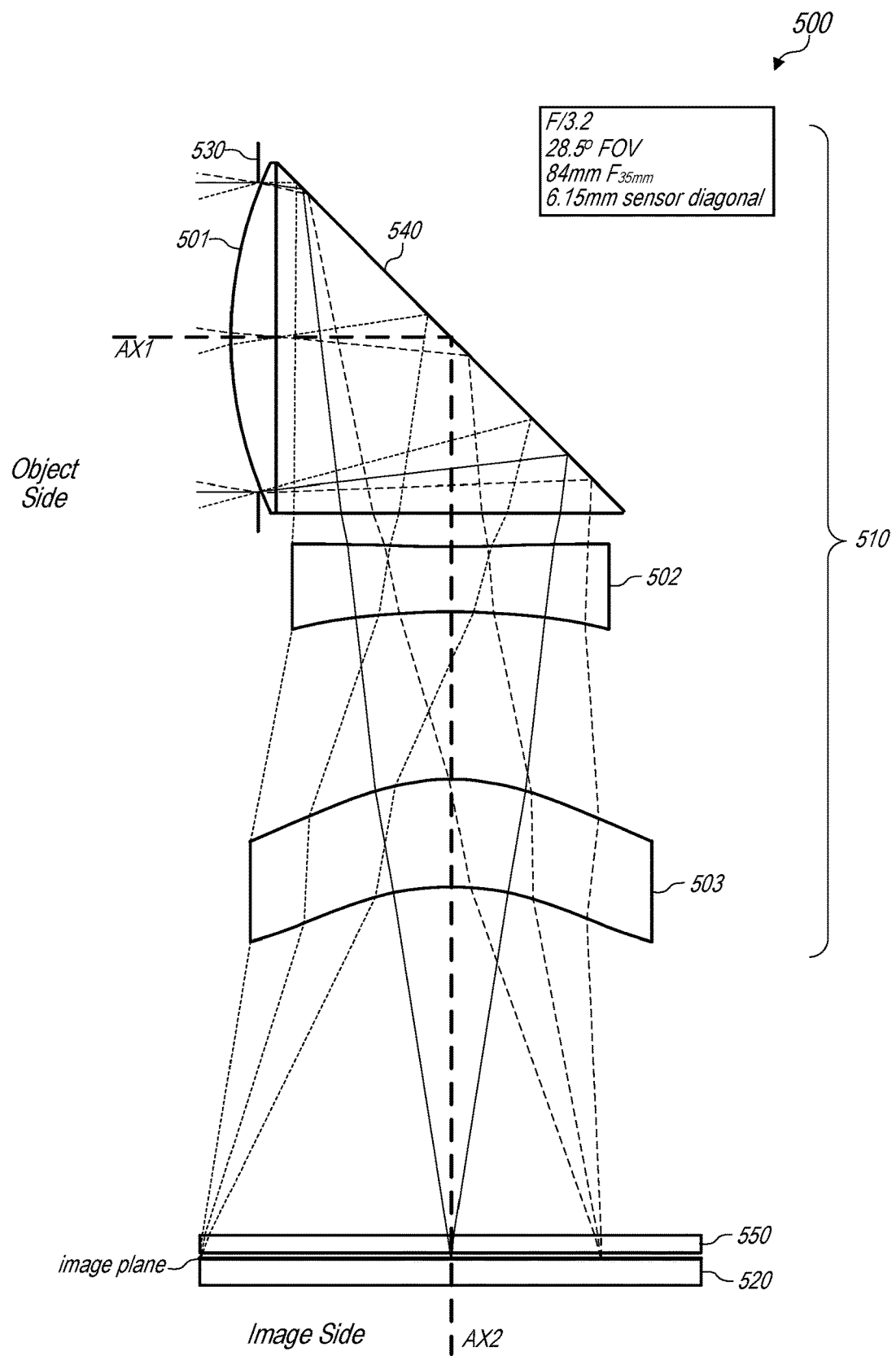
FIG. 5 shows a camera that includes an example embodiment of a compact folded lens system with three lens elements and a light folding element that operates at F/3.2, with 28.5° full FOV.

FIG. 5 shows a camera 500 that includes an example embodiment of a compact folded lens system 510 that operates at F/3.2, with 28.5° full FOV. Camera 500 includes a 6.15 mm diagonal photosensor 520. Lens system 510 includes three lens elements with refractive power and a folding element such as a prism, in order from the object side to the image side of the lens system: a first lens element 501 with positive refractive power, a folding element 540 such as a prism to fold the optical axis from AX1 to AX2, a second lens element 502 with negative refractive power, and a third lens element 503 with refractive power. An aperture stop 530 may be located between the object side of the lens system 510 and the folding element 540, for example at or near the object side surface of lens element 501, for controlling the brightness of the optical system. In some embodiments, the lens system 510 or camera 500 includes an IR filter 550 to reduce or eliminate interference of environmental noises on the photosensor 520.

Tables 19-22 correspond to an embodiment of a lens system 510 as illustrated in FIG. 5, and provide example values for various optical and physical parameters of the lens system 510 and camera 500 of FIG. 5. The effective focal length (EFL) of the lens system 510 is 12 mm. Given the EFL and photosensor size, the 35 mm equivalent focal length of the camera 500 may be 84 mm. While not shown in FIG. 5, in some embodiments, the camera 500/lens system 510 has the capability of autofocusing from Macro to Infinity conjugates.

On-axis and off-axis aberrations for lens system 510 are well balanced across the FOV. Optical distortion across the FOV is controlled within 2%, while field curvature and astigmatism are well balanced across the FOV.

In some embodiments, Z-height of the example lens system 510, as defined from the front vertex of lens element 501 to the rear vertex of the folding element 540, may be 4.85 mm. The lens system 510 is able to fit into a wide variety of portable electronic devices including but not limited to smart phones and tablets.

Example Lens System 610

Figure 6:
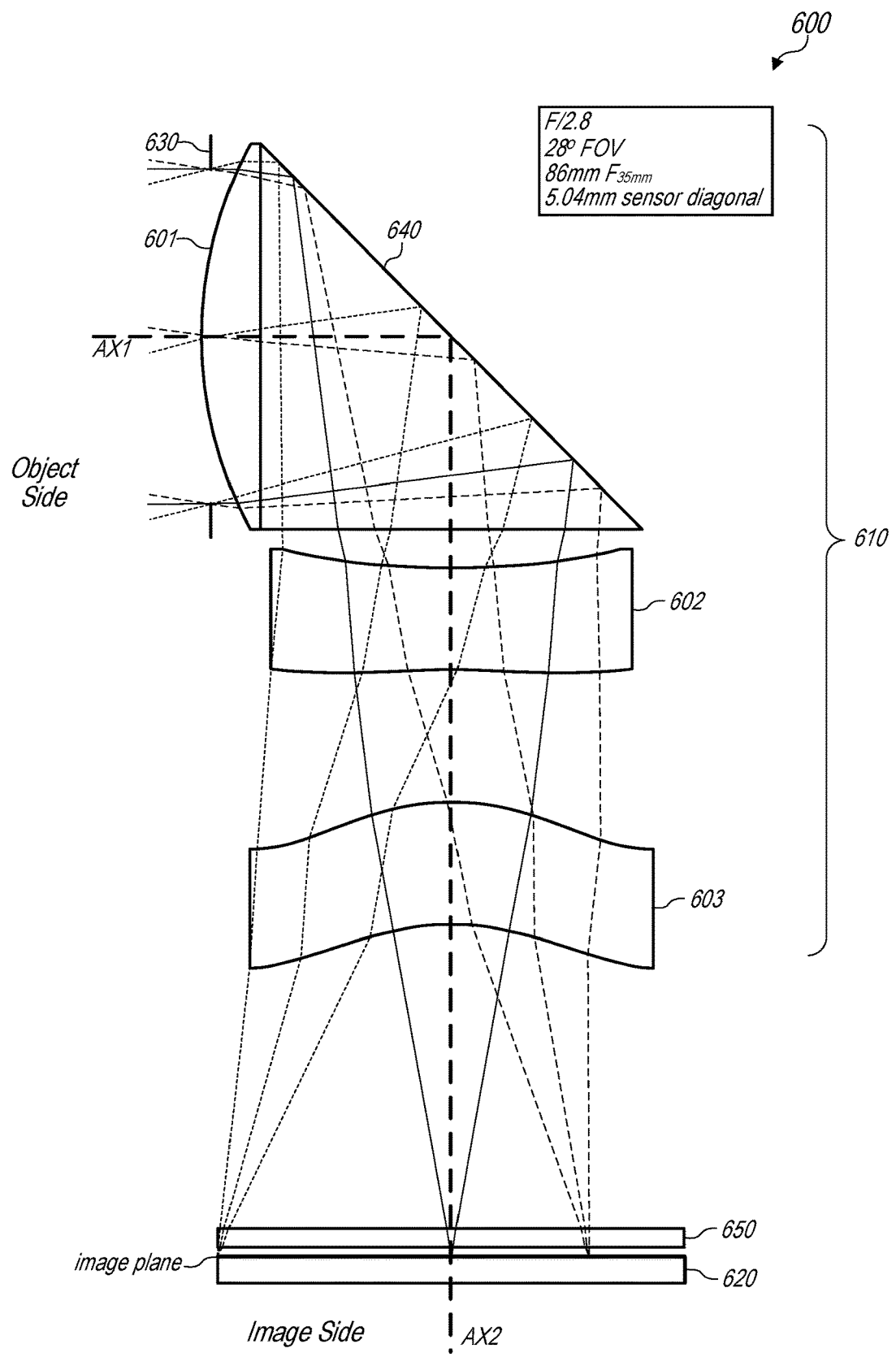
FIG. 6 shows a camera that includes an example embodiment of a compact folded lens system with three lens elements and a light folding element that operates at F/2.8, with 28° full FOV.

FIG. 6 shows a camera 600 that includes an example embodiment of a compact folded lens system 610 that operates at F/2.8, with 28° full FOV. Camera 600 includes a 5.04 mm diagonal photosensor 620. Lens system 610 includes three lens elements with refractive power and a folding element such as a prism, in order from the object side to the image side of the lens system: a first lens element 601 with positive refractive power, a folding element 640 such as a prism to fold the optical axis from AX1 to AX2, a second lens element 602 with negative refractive power, and a third lens element 603 with refractive power. An aperture stop 630 may be located between the object side of the lens system 610 and the folding element 640, for example at or near the front vertex of lens element 601, for controlling the brightness of the optical system. In some embodiments, the lens system 610 or camera 600 includes an IR filter 650 to reduce or eliminate interference of environmental noises on the photosensor 620.

Tables 23-26 correspond to an embodiment of a lens system 610 as illustrated in FIG. 6, and provide example values for various optical and physical parameters of the lens system 610 and camera 600 of FIG. 6. The effective focal length (EFL) of the lens system 610 is 10 mm. Given the EFL and photosensor size, the 35 mm equivalent focal length of the camera 600 may be 86 mm. While not shown in FIG. 6, in some embodiments, the camera 600/lens system 610 has the capability of autofocusing from Macro to Infinity conjugates.

On-axis and off-axis aberrations for lens system 610 are well balanced across the FOV. Optical distortion across the FOV is controlled within 2%, while field curvature and astigmatism are well balanced across the FOV.

In some embodiments, Z-height of the example lens system 610, as defined from the front vertex of lens element 601 to the rear vertex of the folding element 640, may be 4.75 mm. The lens system 610 is able to fit into a wide variety of portable electronic devices including but not limited to smart phones and tablets.

Example Lens System 710

Figure 7A:
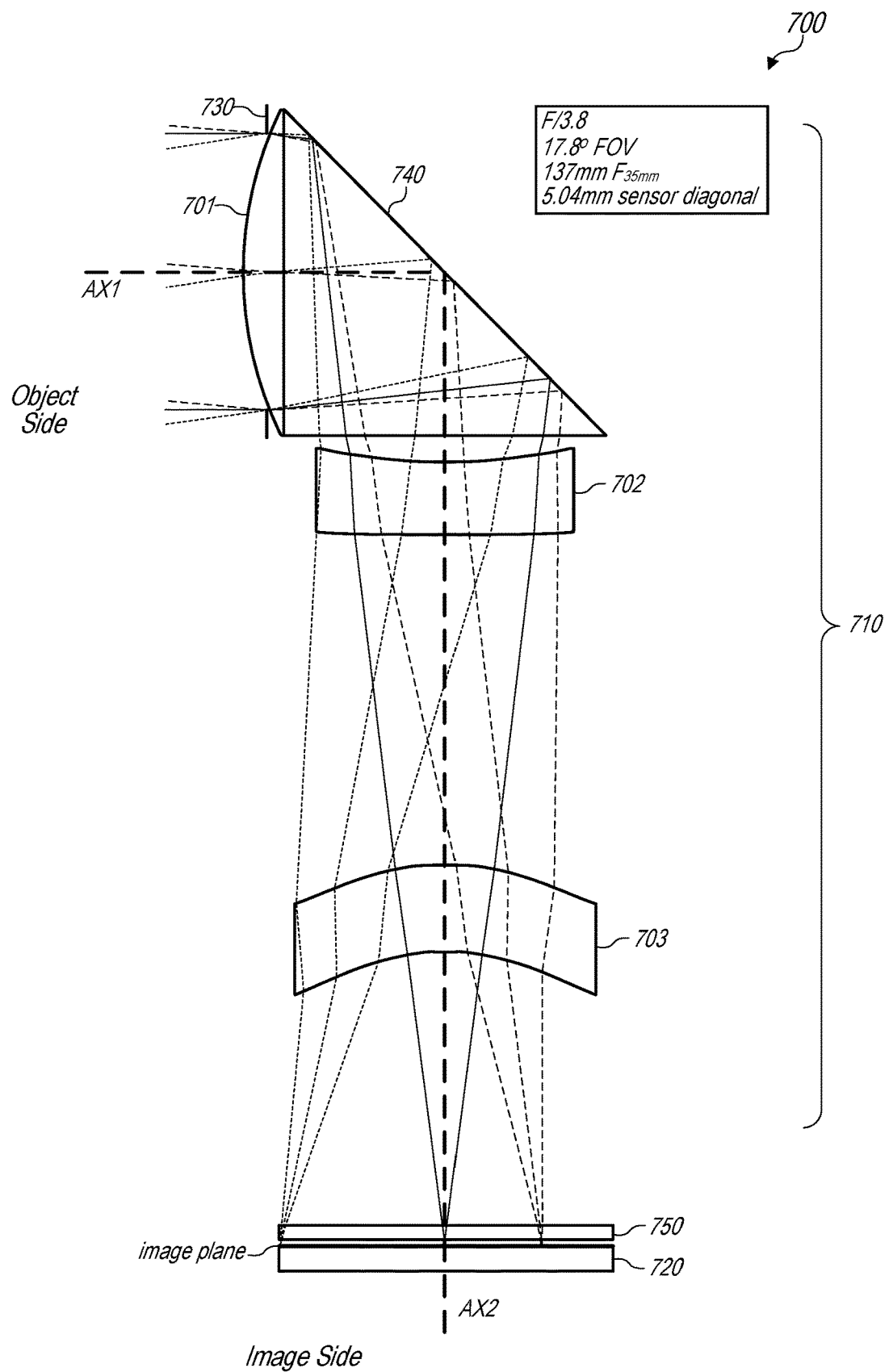
FIGS. 7A and 7B show a camera that includes an example embodiment of a compact folded lens system with three lens elements and a light folding element that operates at F/3.8, with 17.8° full FOV.
Figure 7B:
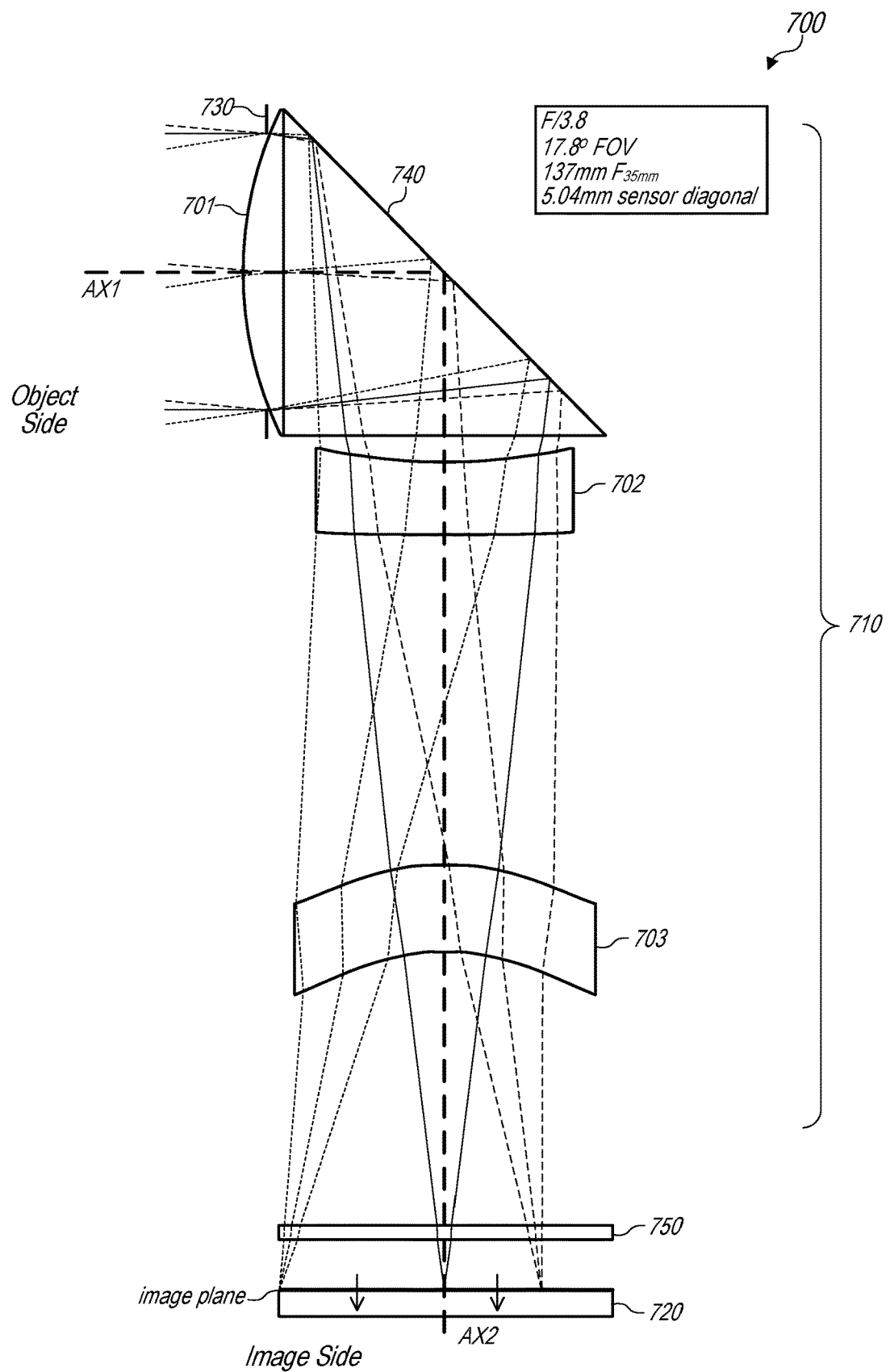

FIGS. 7A and 7B show a camera 700 that includes an example embodiment of a compact folded lens system 710 that operates at F/3.8, with 17.8° full FOV. Camera 700 includes a 5.04 mm diagonal photosensor 720. Lens system 710 includes three lens elements with refractive power and a folding element such as a prism, in order from the object side to the image side of the lens system: a first lens element 701 with positive refractive power, a folding element 740 such as a prism to fold the optical axis from AX1 to AX2, a second lens element 702 with negative refractive power, and a third lens element 703 with refractive power. An aperture stop 730 may be located between the object side of the lens system 710 and the folding element 740, for example at or near the object side surface of lens element 701, for controlling the brightness of the optical system. In some embodiments, the lens system 710 or camera 700 includes an IR filter 750 to reduce or eliminate interference of environmental noises on the photosensor 720.

Tables 27-30 correspond to an embodiment of a lens system 710 as illustrated in FIGS. 7A and 7B, and provide example values for various optical and physical parameters of the lens system 710 and camera 700 of FIGS. 7A and 7B. The effective focal length (EFL) of the lens system 710 is 16 mm. Given the EFL and photosensor size, the 35 mm equivalent focal length of the camera 700 may be 137 mm. In some embodiments, the camera 700/lens system 710 has the capability of autofocusing from Macro to Infinity conjugates.

As shown in FIGS. 7A-7B, in some embodiments the photosensor 720 may be moved on one or more axes relative to the lens system 710 to adjust focus of the camera 700.

FIG. 7A corresponds to the camera 300 focused at a first position (infinity conjugate), and FIG. 7B corresponds to the camera 700 focused at a second position (Macro conjugate). While the focus positions are shown as examples, note that the camera 700 may be focused at other positions in some embodiments.

At both Infinity and Macro conjugates, on-axis and off-axis aberrations for lens system 710 are well balanced across the FOV. At both conjugates, optical distortion across the FOV is controlled within 2%, while field curvature and astigmatism are well balanced across the FOV.

In some embodiments, Z-height of the example lens system 710, as defined from the front vertex of lens element 701 to the rear vertex of the folding element 740, may be 5.5 mm. The lens system 710 is able to fit into a wide variety of portable electronic devices including but not limited to smart phones and tablets.

Example Lens System 810

Figure 8A:
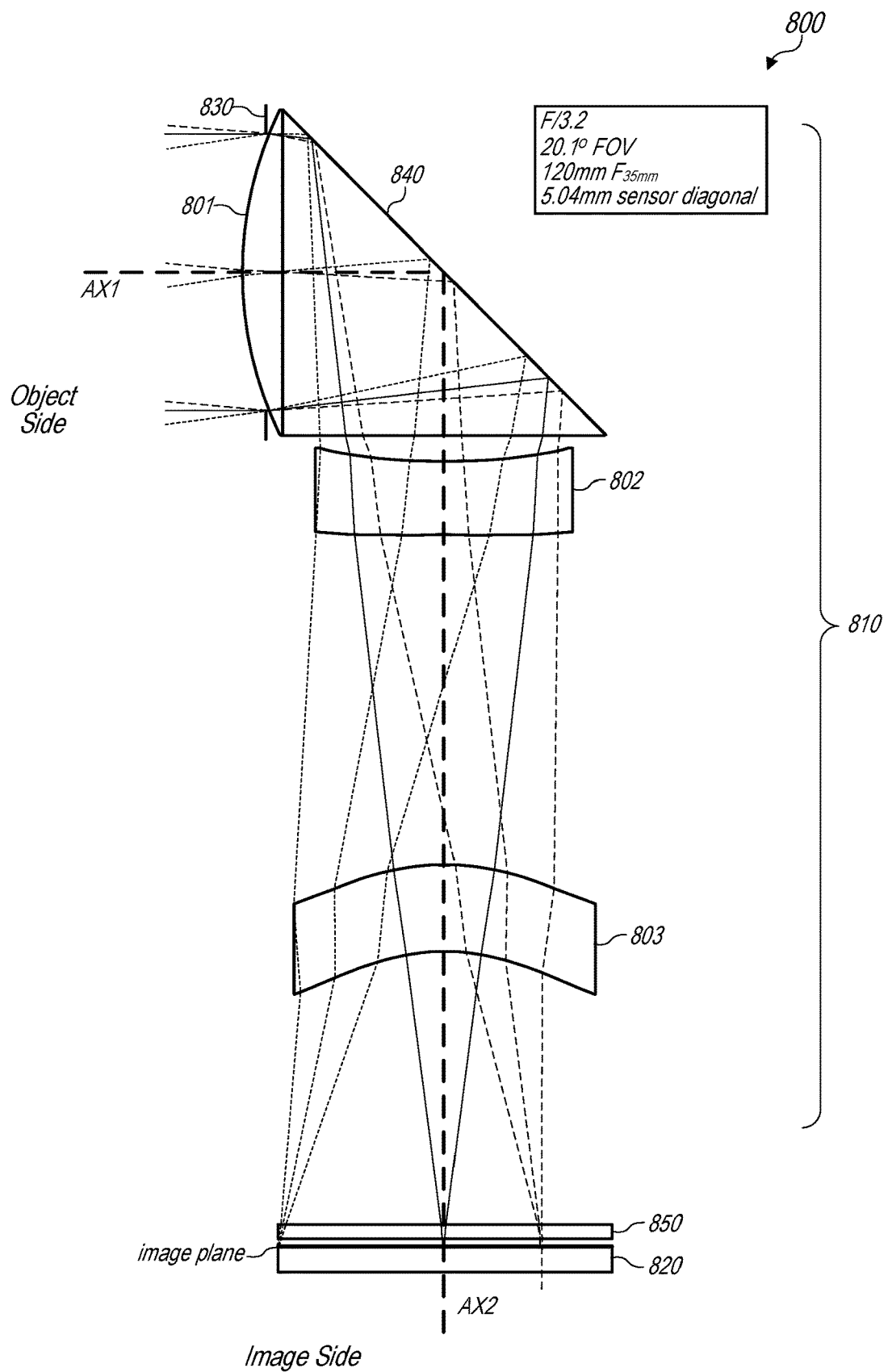
FIGS. 8A and 8B show a camera that includes an example embodiment of a compact folded lens system with three lens elements and a light folding element that operates at F/3.2, with 20.1° full FOV.
Figure 8B:
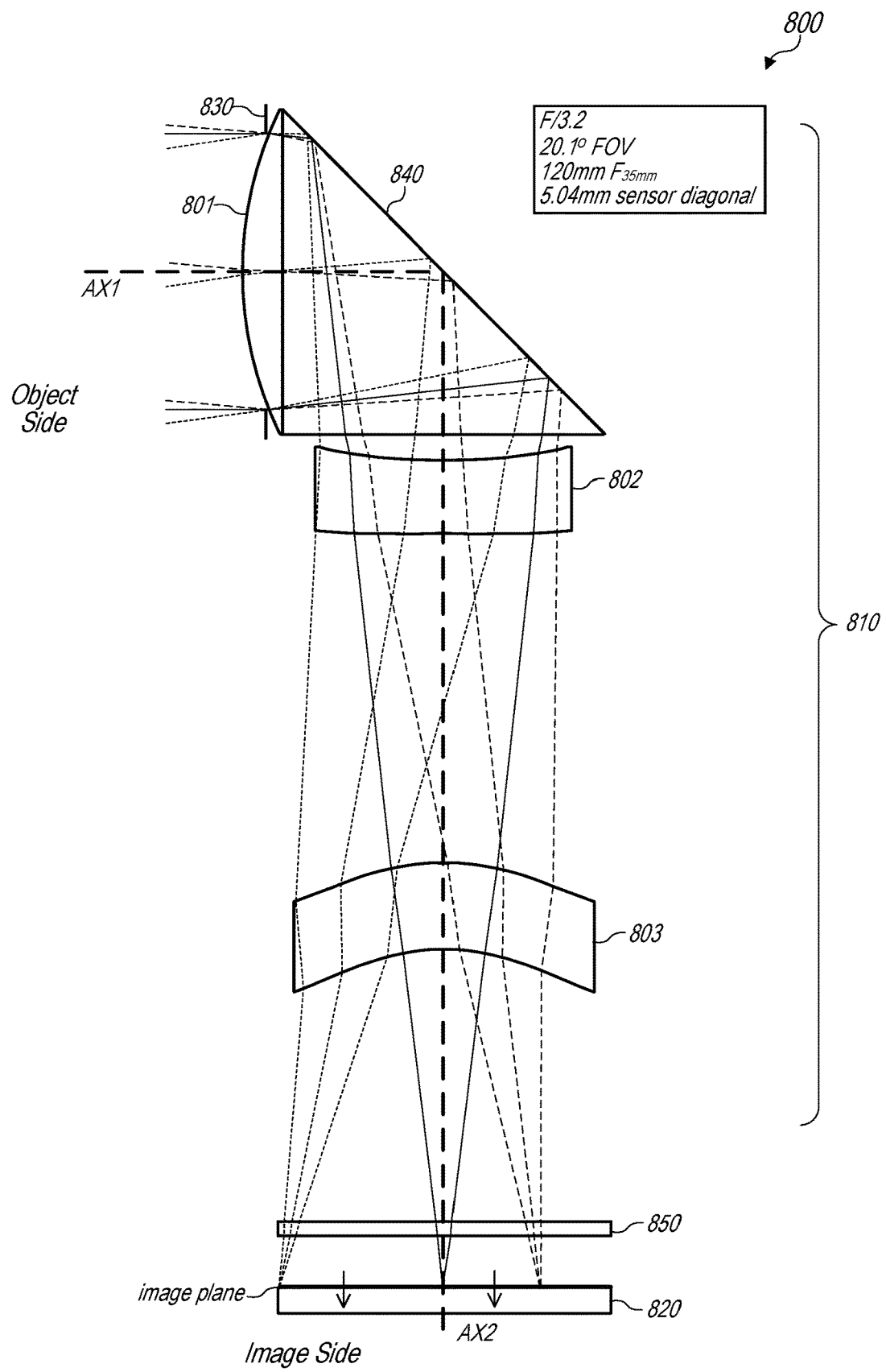

FIGS. 8A and 8B show a camera 800 that includes an example embodiment of a compact folded lens system 810 that operates at F/3.2, with 20.1° full FOV. Camera 800 includes a 5.04 mm diagonal photosensor 820. Lens system 810 includes three lens elements with refractive power and a folding element such as a prism, in order from the object side to the image side of the lens system: a first lens element 801 with positive refractive power, a folding element 840 such as a prism to fold the optical axis from AX1 to AX2, a second lens element 802 with negative refractive power, and a third lens element 803 with refractive power. An aperture stop 830 may be located between the object side of the lens system 810 and the folding element 840, for example at or near the object side surface of lens element 801, for controlling the brightness of the optical system. In some embodiments, the lens system 810 or camera 800 includes an IR filter 850 to reduce or eliminate interference of environmental noises on the photosensor 820.

Tables 31-34 correspond to an embodiment of a lens system 810 as illustrated in FIGS. 8A and 8B, and provide example values for various optical and physical parameters of the lens system 810 and camera 800 of FIGS. 8A and 8B. The effective focal length (EFL) of the lens system 810 is 14 mm. Given the EFL and photosensor size, the 35 mm equivalent focal length of the camera 800 may be 120 mm. In some embodiments, the camera 800/lens system 810 has the capability of autofocusing from Macro to Infinity conjugates.

As shown in FIGS. 8A-8B, in some embodiments the photosensor 820 may be moved on one or more axes relative to the lens system 810 to adjust focus of the camera 800. FIG. 8A corresponds to the camera 800 focused at a first position (infinity conjugate), and FIG. 8B corresponds to the camera 800 focused at a second position (Macro conjugate). While the focus positions are shown as examples, note that the camera 700 may be focused at other positions in some embodiments.

At both Infinity and Macro conjugates, on-axis and off-axis aberrations for lens system 810 are well balanced across the FOV. At both conjugates, optical distortion across the FOV is controlled within 2%, while field curvature and astigmatism are well balanced across the FOV.

In some embodiments, Z-height of the example lens system 810, as defined from the front vertex of lens element 801 to the rear vertex of the folding element 840, may be 5.4 mm. The lens system 810 is able to fit into a wide variety of portable electronic devices including but not limited to smart phones and tablets.

Folded Lens Systems with Three Lens Elements—Alternative Embodiments

Figure 9:
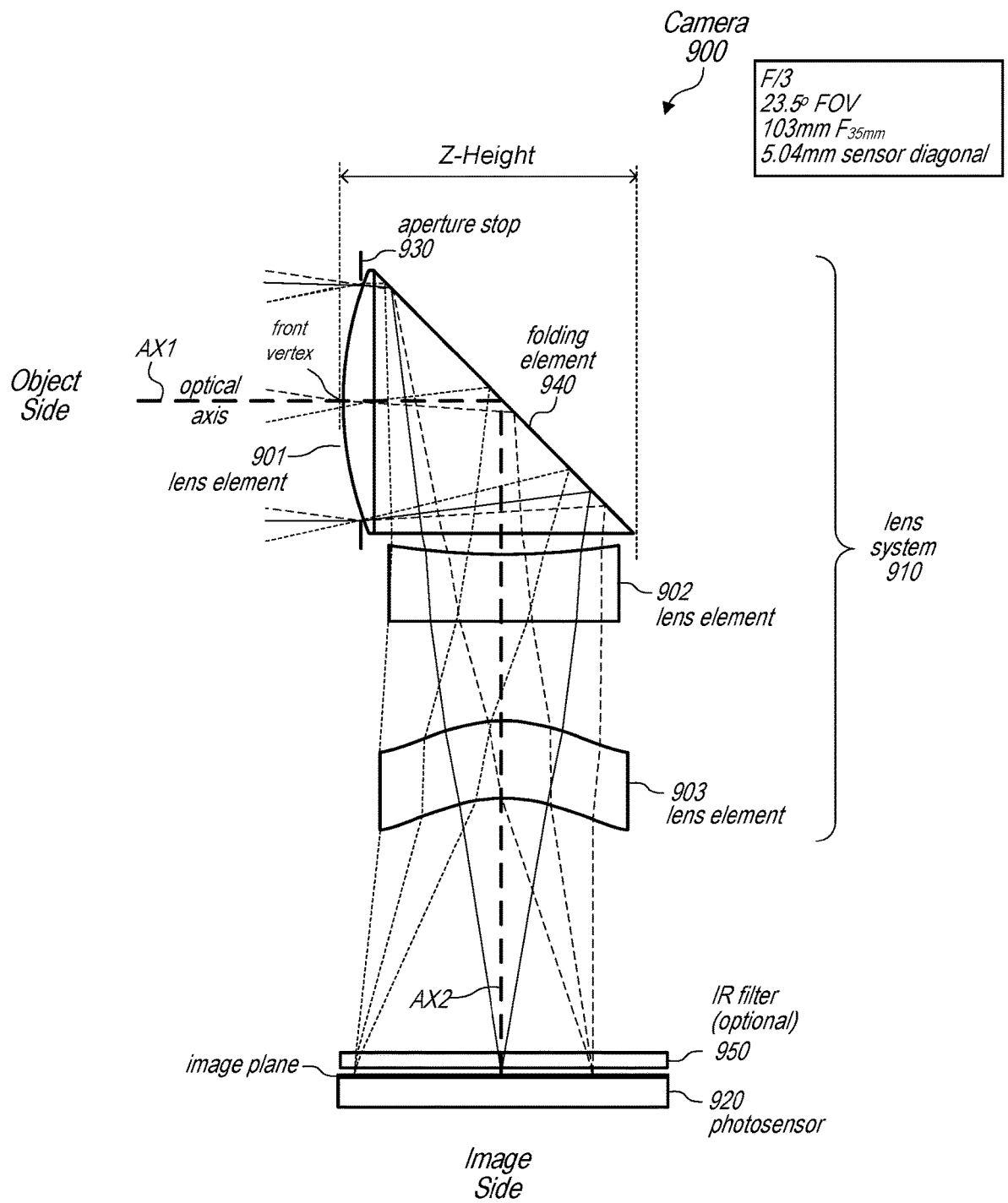
FIG. 9 is a cross-sectional illustration of a compact camera including an example embodiment of a compact folded lens system with three lens elements and a light folding element.

FIG. 9 is a cross-sectional illustration of a compact camera 900 including an example embodiment of a compact folded lens system 910 with three lens elements 901-903 and a light folding element 940 such as a prism that "folds" the optical axis of the lens system 910. The camera 900 may also include an aperture stop 930, an optional infrared (IR) filter 950, and a photosensor 920. A compact camera 900 including an embodiment of the compact folded lens system 910 as illustrated in FIG. 9 may, for example, be implemented in portable electronic devices such as mobile phones and tablets. In embodiments of a lens system 910 as illustrated in FIG. 9, the 35 millimeter (mm) equivalent focal length ($f_{35mm}$) of the lens system 910 may be longer than 60 mm. A compact folded lens system 910 having a long $f_{35mm}$ may, for example, be used stand-alone for telephoto photography, or can be paired with a wide-angle imaging lens in a dual-prime configuration to enable effective optical zoom for portable electronic devices.

Embodiments of the compact folded lens system 910 may include three lens elements 901-903 with refractive power and a light folding element 940 such as a prism to fold the optical axis. Some embodiments of the compact folded lens system 910 may provide a 35 mm equivalent focal length in the range of 85-200 mm and less than 6 mm of Z-height to fit in a wide variety of portable electronics devices. With proper arrangement of materials and lens powers, embodiments of the compact folded lens system 910 are capable of capturing high brightness photos with near diffraction-limited image quality.

As illustrated in the example camera 900 of FIG. 9, the compact folded lens system 910 includes three lens elements 901-903 with refractive power and a light folding element 940 (e.g., a prism), in order from the object side to the image side of the lens system 910: a first lens element 901 with positive refractive power; a folding element 940 such as a prism to fold the optical axis from AX1 to AX2; a second lens element 902 with negative refractive power; and a third lens element 903 with refractive power. An aperture stop 930 may be located between the object side of the lens system 910 and the folding element 940 for controlling the brightness of the lens system 910.

In some embodiments, the camera 900 includes an IR filter 950 to reduce or eliminate interference of environmental noises on the photosensor 920. In some embodiments, the photosensor 920 and/or lens system 910 may be shifted along AX2 to allow refocusing of the lens system 910 in between Infinity conjugate and Macro conjugate. In various embodiments, lens element 902 and/or lens element 903 may be round/circular or rectangular, or some other shape.

In embodiments of lens system 910, one or more of the following requirements may be satisfied, for example to facilitate correction of aberrations across the field of view (FOV) for the lens system 910:

Lens element 901 has a convex object-side surface in the paraxial region.

Lens element 903 has a concave image-side surface in the paraxial region.

In various embodiments, the other lens surfaces of lens elements 901 through 903 may be concave, convex, or flat/plano (e.g., the lenses may be plano-concave or plano-convex lenses) in the paraxial region.

In some embodiments, at least one of the six lens surfaces may be aspheric.

In some embodiments, at least one of the lens elements is made of a lightweight polymer or plastic material.

In some embodiments, lens element 901 is formed of an optical material with Abbe number Vd>40, and lens element 902 is formed of an optical material with Abbe number Vd<30. The material and power configurations of lens element 901 and lens element 902 are selected for reduction of chromatic aberrations.

In some embodiments, lens element 903 is formed of an optical material with no limit in Abbe number.

FIG. 9 shows an example camera 900 that includes an example embodiment of a compact folded lens system 910 that operates at F/3, with 23.5° full FOV. Camera 900 includes a 5.04 mm diagonal photosensor 920. The effective focal length (EFL) of the lens system 910 is 12 mm. Given the EFL and photosensor size, the 35 mm equivalent focal length of the camera 900 may be as large as 103 mm. In some embodiments, the camera 900/lens system 910 has the capability of autofocusing from 300 mm to Infinity conjugates.

The modulation transfer functions (MTFs) for lens system 910 when focused at Infinity and Macro (300 mm) conjugates, at all fields and both conjugates, are close to diffraction limited; the lens system 910 provides good contrast for high-resolution imaging. At both conjugates, on-axis and off-axis aberrations for lens system 910 are well balanced across the FOV. At both conjugates, optical distortion across the FOV is controlled within 2%, while field curvature and astigmatism are well balanced across the FOV.

In some embodiments, Z-height of the example lens system 910, as defined from the front vertex of lens element 901 to the rear vertex of the folding element 940, may be 5 mm. The lens system 910 is able to fit into a wide variety of portable electronic devices including but not limited to smart phones and tablets.

Example Lens System Tables

The following Tables provide example values for various optical and physical parameters of the example embodiments of the lens systems and cameras as described in reference to FIGS. 1A through 9. Tables 1-5 correspond to an example embodiment of a lens system 110 as illustrated in FIGS. 1A and 1B. Tables 6-9 correspond to an example embodiment of a lens system 210 as illustrated in FIG. 2. Tables 10-14 correspond to an example embodiment of a lens system 310 as illustrated in FIGS. 3A and 3B. Tables 15-18 correspond to an example embodiment of a lens system 410 as illustrated in FIG. 4. Tables 19-22 correspond to an example embodiment of a lens system 510 as illustrated in FIG. 5. Tables 23-26 correspond to an example embodiment of a lens system 610 as illustrated in FIG. 6. Tables 27-30 correspond to an example embodiment of a lens system 710 as illustrated in FIGS. 7A and 7B. Tables 31-34 correspond to an example embodiment of a lens system 810 as illustrated in FIGS. 8A and 8B. Tables 35-38 correspond to an example embodiment of a lens system 910 as illustrated in FIG. 9.

In the Tables, all dimensions are in millimeters (mm) unless otherwise specified. L1, L2, and L3 stand for refractive lenses 1, 2, and 3, respectively. "S#" stands for surface number. A positive radius indicates that the center of curvature is to the right (object side) of the surface. A negative radius indicates that the center of curvature is to the left (image side) of the surface. "INF" stands for infinity (as used in optics). The thickness (or separation) is the axial distance to the next surface. FNO stands for F-number of the lens system. FOV stands for full field of view. $f_{35mm}$ is the 35 mm equivalent focal length of the lens system. $V_1$ is the Abbe number of the first lens element, and $V_2$ is the Abbe number of the second lens element. Both f and EFL stand for effective focal length of the lens system, f1 stands for focal length of the first lens element, and f2 stands for focal length of the second lens element. R3f is radius of curvature of the object-side surface of lens 3, and R3r is radius of curvature of the image side surface of lens 3. Z stands for Z-height of the lens system as defined from the front (image side) vertex of the lens system to the rear vertex of the folding element (e.g., prism), as shown in FIGS. 1A and 9. REFL represents a reflective surface.

For the materials of the lens elements and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d = (N_d - 1)/(N_F - N_C),$$

where $N_F$ and $N_C$ are the refractive index values of the material at the F and C lines of hydrogen, respectively.

Referring to the Tables of aspheric coefficients (Tables, 2, 7, 11, 16, 20, 24, 28, 32, and 36), the aspheric equation describing an aspherical surface may be given by:

$$Z = (cr^2/(1+sqrt[1-(1+K)c^2r^2])) + A_4 r^4 + A_6 r^6 + A_8 r^8 + A_{10} r^{10} + A_{12} r^{12} + A_{14} r^{14} + A_{16} r^{16} + A_{18} r^{18} + A_{20} r^{20}$$

where Z is the sag of surface parallel to the z-axis (the z-axis and the optical axis are coincident in these example embodiments), r is the radial distance from the vertex, c is the curvature at the pole or vertex of the surface (the reciprocal of the radius of curvature of the surface), K is the conic constant, and $A_4$-$A_{20}$ are the aspheric coefficients. In the Tables, "E" denotes the exponential notation (powers of 10).

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some values in the Tables may be scaled up or down for larger or smaller implementations of a camera using an embodiment of a lens system as described herein.

Figure 10A:
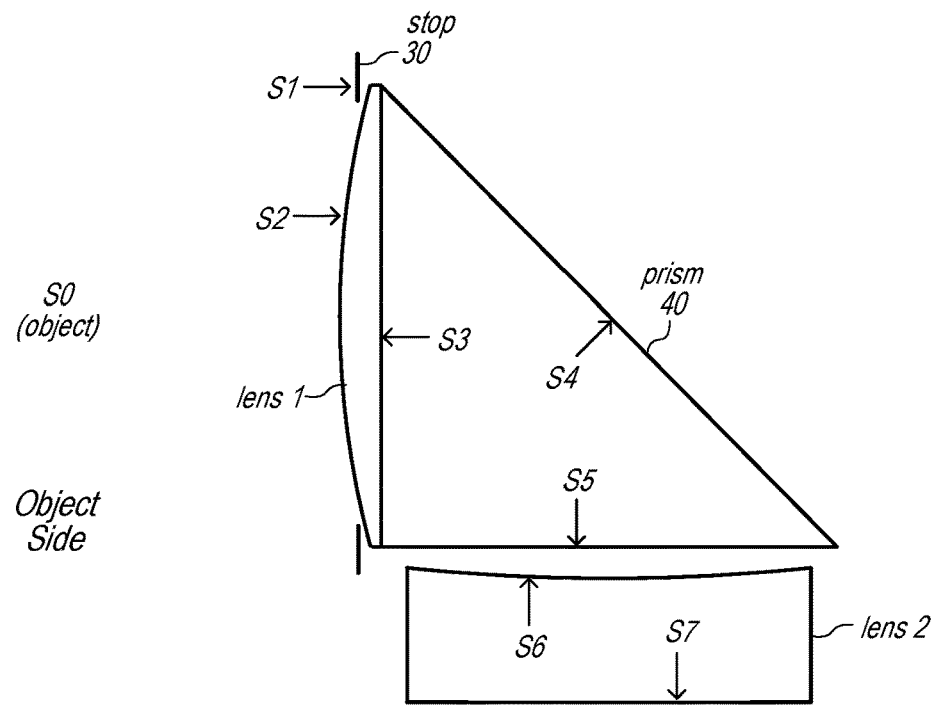
FIGS. 10A and 10B illustrate numbering of the surfaces in the example lens systems as used in the Tables.
Figure 10A:
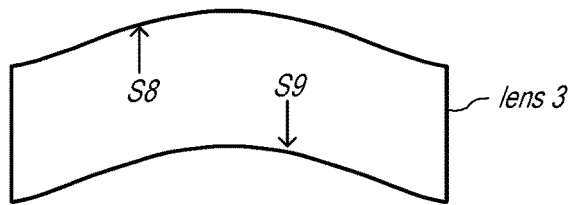
Figure 10A:
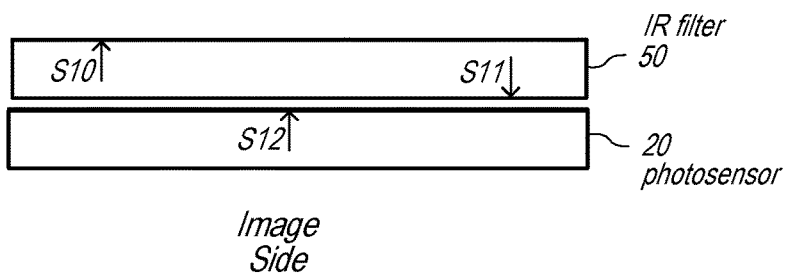
Figure 10B:
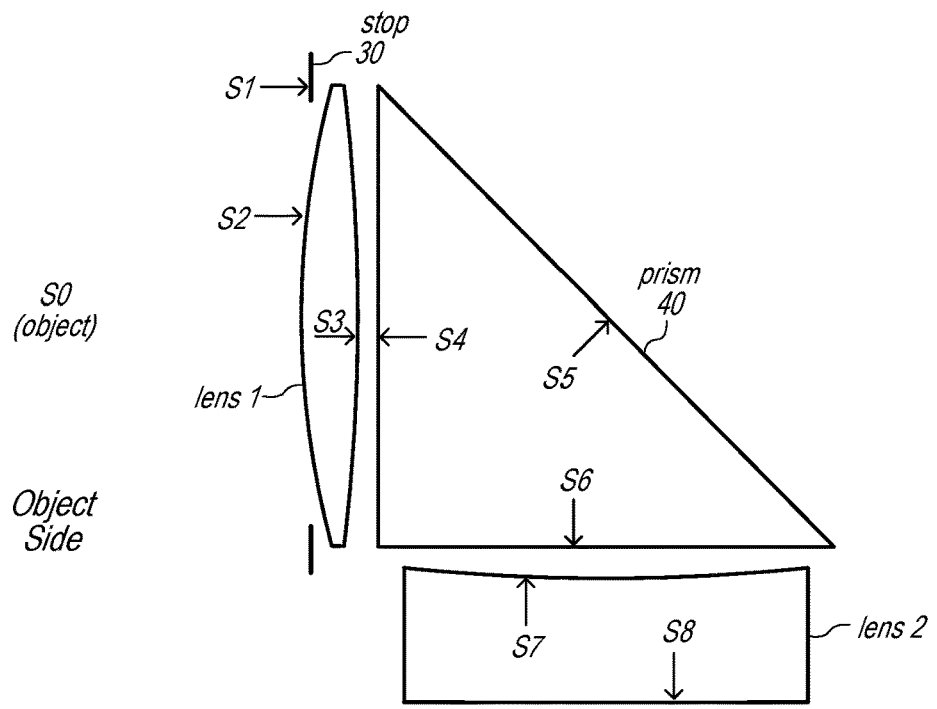
Figure 10B:
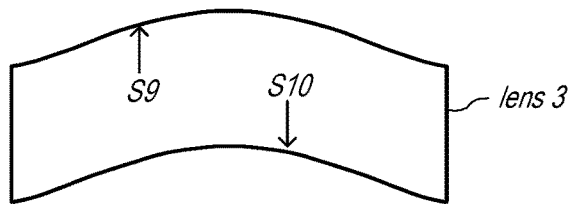
Figure 10B:
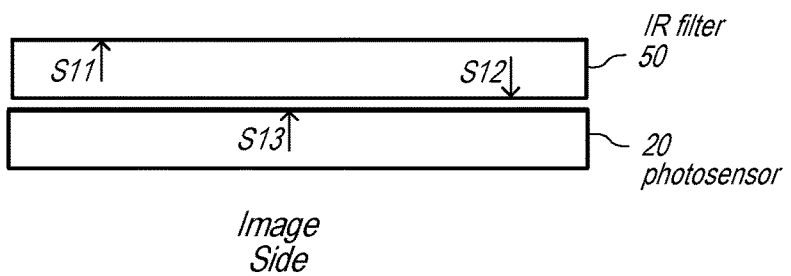

Further note that surface numbers (S#) of the elements in the various embodiments of the lens system as shown in the Tables are listed from a first surface 0 at the object plane to a last surface at the image plane/photosensor surface. FIGS. 10A and 10B illustrate numbering of the surfaces as used in the Tables. As shown in FIG. 10A, in some embodiments of a compact folded lens system as described herein, the image side surface of the first lens element (lens 1) may be flat/plano (e.g., lens 1 may be plano-convex), and the image side surface of lens 1 may be at/in contact with the object side surface of the light folding prism 40 to effectively form a single combined unit or element. In these embodiments, the image side surface of lens 1 and the object side surface of the prism 40 form and are designated as a single surface, and the surfaces are numbered as illustrated in FIG. 10A:

S0—Object plane
S1—Aperture stop
S2—Lens 1, object side surface
S3—Prism 40, image side surface
S4—Prism 40, reflective surface
S5—Prism, object side surface
S6—Lens 2, object side surface
S7—Lens 2, image side surface
S8—Lens 3, object side surface S9—Lens 3, image side surface
S10—IR filter 50, object side surface
S11—IR filter 50, image side surface
S12—Photosensor 20, image plane However, in some embodiments, as shown in FIG. 10B and in Tables 10-14 corresponding to an embodiment of a lens system 310 as illustrated in FIGS. 3A and 3B, the image side surface of lens 1 may be convex, concave, or flat-plano, and lens 1 and the folding element (prism) may be air-spaced. In these embodiments, the image side surface of lens 1 and the object side surface of the prism 40 are designated as separate surfaces, and the surfaces are numbered as illustrated in FIG. 10B:

S0—Object plane
S1—Aperture stop
S2—Lens 1, object side surface
S3—Lens 1, image side surface
S4—Prism 40, image side surface
S5—Prism 40, reflective surface
S6—Prism, object side surface
S7—Lens 2, object side surface
S8—Lens 2, image side surface
S9—Lens 3, object side surface
S10—Lens 3, image side surface
S11—IR filter 50, object side surface
S12—IR filter 50, image side surface
S13—Photosensor 20, image plane

TABLE 3

Decentering Constants (Lens System 110)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 4

Zoom Parameters (Lens System 110)

| **Zoom parameters | Position - 1 | Position - 2 |
|---|---|---|
| **1 | Infinity | 500 mm |
| **2 | 0.000 | −0.294 mm |

TABLE 1

Lens system 110
Fno = 2.6, EFL = 12 mm, FOV = 23.5°, $f_{35\,mm}$ = 103 mm

| Element | Surface (S#) | Radius (mm) | Thickness or separation (mm) | | Refractive Index $N_d$ | Abbe Number $V_d$ |
|---|---|---|---|---|---|---|
| Object | 0 | INF | INF **1 | | | |
| Stop | 1 | INF | −0.559 | | | |
| L1 | *2 | 4.79 | 0.791 | | 1.513 | 56.6 |
| Prism | 3 | INF | 2.503 | | 1.755 | 27.6 |
| Decenter (1) | | | | | | |
| | 4 | INF | −2.503 | REFL | | |
| Bend (1) | | | | | | |
| | 5 | INF | −0.4 | | | |
| L2 | *6 | 12.618 | −1.1 | | 1.651 | 21.5 |
| | *7 | −15.437 | −2.0314 | | | |
| L3 | *8 | −2.663 | −1.31 | | 1.545 | 55.9 |
| | *9 | −2.889 | −3.534 | | | |
| IR filter | 10 | INF | −0.21 | | 1.517 | 64.2 |
| | 11 | INF | −0.1 | | | |
| Sensor | 12 | INF | 0 **2 | | | |

*Annotates aspheric surfaces (aspheric coefficients given in Table 2)
** Annotates zoom parameters (values given in Table 4)

TABLE 2

Aspheric Coefficients (Lens System 110)

| | Surface (S#) | | | | |
|---|---|---|---|---|---|
| | S2 | S6 | S7 | S8 | S9 |
| K | 0 | 0 | 0 | 0 | 0 |
| A4 | −1.32813E−04 | 6.25381E−03 | 1.16388E−02 | 1.57550E−02 | 1.08702E−02 |
| A6 | −1.18004E−05 | −1.75760E−03 | −3.19460E−03 | 5.84137E−04 | 1.17471E−03 |
| A8 | 0.00000E+00 | 2.52318E−04 | 5.75871E−04 | −4.73641E−05 | 7.75787E−05 |
| A10 | 0.00000E+00 | −3.09906E−05 | −1.13692E−04 | 4.04236E−05 | −8.08033E−05 |
| A12 | 0.00000E+00 | 3.51844E−06 | 1.70836E−05 | −7.61907E−06 | 1.85788E−05 |
| A14 | 0.00000E+00 | −1.71816E−07 | −1.13786E−06 | 8.24266E−07 | −1.31203E−06 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 5

| Optical Definitions (Lens system 110) | | | |
|---|---|---|---|
| EFL | 12 mm | $V_1$ | 56.6 |
| FNO | 2.6 | $V_2$ | 21.5 |
| FOV | 23.5° | |f/f1| | 0.74 |
| $f_{35\ mm}$ | 103 mm | |f/f2| | 1.57 |
| Z | 5.8 mm | |R3f/R3r| | 0.93 |

TABLE 6

Lens system 210
Fno = 2.1, EFL = 10 mm, FOV = 25.1°, $f_{35\ mm}$ = 95 mm

| Element | Surface (S#) | Radius (mm) | Thickness or separation (mm) | | Refractive Index $N_d$ | Abbe Number $V_d$ |
|---|---|---|---|---|---|---|
| Object | 0 | INF | INF | | | |
| Stop | 1 | INF | −0.7049 | | | |
| L1 | *2 | 4.1908 | 0.9349 | | 1.513 | 56.6 |
| Prism | 3 | INF | 2.5361 | | 1.755 | 27.6 |
| | Decenter (1) | | | | | |
| | 4 | INF | −2.5361 | REFL | | |
| | Bend (1) | | | | | |
| | 5 | INF | −0.2401 | | | |
| L2 | *6 | −23.2221 | −1.1000 | | 1.651 | 21.5 |
| | *7 | −3.9100 | −1.6457 | | | |
| L3 | *8 | −2.5271 | −1.3100 | | 1.545 | 55.9 |
| | *9 | −3.3298 | −2.0649 | | | |
| IR filter | 10 | INF | −0.2100 | | 1.517 | 64.2 |
| | 11 | INF | −0.1000 | | | |
| Sensor | 12 | INF | 0.0000 | | | |

*Annotates aspheric surfaces (aspheric coefficients given in Table 7)

TABLE 7

Aspheric Coefficients (Lens System 210)

| | Surface (S#) | | | | |
|---|---|---|---|---|---|
| | S2 | S6 | S7 | S8 | S9 |
| K | 0 | 0 | 0 | 0 | 0 |
| A4 | −2.27630E−04 | 1.66965E−02 | 2.17812E−02 | 9.21295E−03 | −4.36565E−04 |
| A6 | −2.38687E−05 | −8.53386E−03 | −6.71712E−03 | 5.98333E−03 | 4.11661E−03 |
| A8 | 0.00000E+00 | 6.32611E−03 | 1.95176E−03 | −6.02221E−03 | −2.47270E−03 |
| A10 | 0.00000E+00 | −3.37289E−03 | −4.87582E−04 | 3.45128E−03 | 5.98747E−04 |
| A12 | 0.00000E+00 | 1.10753E−03 | 6.23350E−05 | −1.16209E−03 | 5.97803E−05 |
| A14 | 0.00000E+00 | −2.07907E−04 | −1.42163E−06 | 2.30826E−04 | −6.67851E−05 |
| A16 | 0.00000E+00 | 1.95047E−05 | 0.00000E+00 | −2.50104E−05 | 1.26669E−05 |
| A18 | 0.00000E+00 | −6.02309E−07 | 0.00000E+00 | 0.00000E+00 | −7.50902E−07 |
| A20 | 0.00000E+00 | 0.00000E+00 | 0.00000E+00 | 0.00000E+00 | 0.00000E+00 |

TABLE 8

Decentering Constants (Lens System 210)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 9

| Optical Definitions (Lens system 210) | | | |
|---|---|---|---|
| EFL | 10 mm | $V_1$ | 56.6 |
| FNO | 2.1 | $V_2$ | 21.5 |
| FOV | 25.1° | |f/f1| | 0.70 |
| $f_{35\ mm}$ | 95 mm | |f/f2| | 1.95 |
| Z | 6 mm | |R3f/R3r| | 0.76 |

TABLE 10

Lens system 310
Fno = 3.3, EFL = 14 mm, FOV = 20.3°, $f_{35\,mm}$ = 120 mm

| Element | Surface (S#) | Radius (mm) | Thickness or separation (mm) | | Refractive Index $N_d$ | Abbe Number $V_d$ |
|---|---|---|---|---|---|---|
| Object | 0 | INF | INF **1 | | | |
| Stop | 1 | INF | −0.1 | | | |
| L1 | *2 | 6.2947 | 0.6421 | | 1.513 | 56.6 |
| | 3 | −26.5633 | 0.1 | | | |
| Prism | 4 | INF | 2.4188 | | 1.755 | 27.6 |
| | Decenter (1) | | | | | |
| Lens 2 | 5 | INF | −2.4188 | REFL | | |
| | Bend (1) | | | | | |
| | 6 | INF | −0.4 | | | |
| L2 | *7 | 4.3234 | −1.1 | | 1.651 | 21.5 |
| | *8 | 10 | −1.5007 | | | |
| L3 | *9 | −2.9320 | −1.31 | | 1.545 | 55.9 |
| | *10 | −3.0122 | −5.9174 | | | |
| IR filter | 11 | INF | −0.21 | | 1.517 | 64.2 |
| | 12 | INF | −0.1 | | | |
| Sensor | 13 | INF | 0 **2 | | | |

*Annotates aspheric surfaces (aspheric coefficients given in Table 11)
** Annotates zoom parameters (values given in Table 13)

TABLE 11

Aspheric Coefficients (Lens System 310)

| | Surface (S#) | | | | |
|---|---|---|---|---|---|
| | S2 | S7 | S8 | S9 | S10 |
| K | 0 | 0 | 0 | 0 | 0 |
| A4 | −7.53594E−04 | −2.05740E−02 | −1.01611E−02 | 1.57282E−02 | 1.57571E−02 |
| A6 | −5.97512E−05 | 5.46667E−04 | −1.40041E−03 | −8.47553E−04 | −6.73362E−04 |
| A8 | 0.00000E+00 | 1.06822E−04 | 2.50611E−04 | 1.39986E−04 | 9.71331E−05 |
| A10 | 0.00000E+00 | −3.80956E−05 | −2.59255E−05 | −5.92396E−06 | −4.36111E−06 |
| A12 | 0.00000E+00 | 4.98149E−06 | −1.48356E−06 | 3.29881E−07 | 1.58201E−06 |
| A14 | 0.00000E+00 | −2.27653E−07 | 3.81073E−07 | 7.35242E−09 | −2.16510E−07 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 12

Decentering Constants (Lens System 310)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 13

Zoom Parameters (Lens System 310)

| **Zoom parameters | Position - 1 | Position - 2 |
|---|---|---|
| **1 | Infinity | 400 mm |
| **2 | 0.000 | −0.509 mm |

TABLE 14

Optical Definitions (Lens system 310)

| EFL | 14 mm | $V_1$ | 56.6 |
|---|---|---|---|
| FNO | 3.3 | $V_2$ | 21.5 |
| FOV | 20.3° | |f/f1| | 1.41 |
| $f_{35\,mm}$ | 120 mm | |f/f2| | 0.79 |
| Z | 5.6 mm | |R3f/R3r| | 0.97 |

TABLE 15

Lens system 410
Fno = 2.4, EFL = 11 mm, FOV = 22.9°, $f_{35\,mm}$ = 105 mm

| Element | Surface (S#) | Radius (mm) | Thickness or separation (mm) | | Refractive Index $N_d$ | Abbe Number $V_d$ |
|---|---|---|---|---|---|---|
| Object | 0 | INF | INF | | | |
| Stop | 1 | INF | −0.6529 | | | |
| L1 | *2 | 4.1356 | 0.8829 | | 1.545 | 56 |
| Prism | 3 | INF | 2.4771 | | 1.651 | 21.5 |
| | Decenter (1) | | | | | |
| Lens 2 | 4 | INF | −2.4771 | REFL | | |
| | Bend (1) | | | | | |
| | 5 | INF | −0.6921 | | | |
| L2 | *6 | 2.6294 | −0.6000 | | | |
| | *7 | 8.7797 | −0.7258 | | 1.651 | 21.5 |
| L3 | *8 | −3.0194 | −1.0417 | | | |
| | *9 | −4.4738 | −3.0988 | | 1.585 | 29.9 |
| IR filter | 10 | INF | −0.2100 | | | |
| | 11 | INF | −0.1000 | | 1.517 | 64.2 |
| Sensor | 12 | INF | 0.0000 | | | |

*Annotates aspheric surfaces (aspheric coefficients given in Table 16)

TABLE 16

Aspheric Coefficients (Lens System 410)

| | Surface (S#) | | | | |
|---|---|---|---|---|---|
| | S2 | S6 | S7 | S8 | S9 |
| K | 0 | 0 | 0 | 0 | 0 |
| A4 | −3.27067E−04 | −3.77803E−02 | −9.36581E−03 | 3.64492E−02 | 1.98035E−02 |
| A6 | −3.44231E−05 | 2.77969E−03 | −7.36285E−03 | −6.81817E−03 | −9.64138E−04 |
| A8 | 0.00000E+00 | −1.25370E−03 | 1.49418E−03 | 1.21923E−03 | −3.31076E−04 |
| A10 | 0.00000E+00 | 5.73173E−04 | −2.45312E−04 | −3.00080E−04 | 2.93677E−06 |
| A12 | 0.00000E+00 | −1.14250E−04 | 4.74314E−05 | 6.16689E−05 | 2.42630E−05 |
| A14 | 0.00000E+00 | 8.90788E−06 | −2.64123E−06 | −4.64269E−06 | −2.84035E−06 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 17

Decentering Constants (Lens System 410)

| Decenter | X | Y | Z | Alpha(deg) | Beta(deg) | Gamma(deg) |
|---|---|---|---|---|---|---|
| D(1) and Bend (1) | 0 | 0 | 0 | 45 | 0 | 0 |

TABLE 18

Optical Definitions (Lens system 410)

| EFL | 11 mm | $V_1$ | 56.6 |
|---|---|---|---|
| FNO | 2.4 | $V_2$ | 21.5 |
| FOV | 22.9° | |f/f1| | 0.88 |
| $f_{35\,mm}$ | 105 mm | |f/f2| | 2.1 |
| Z | 5.85 mm | |R3f/R3r| | 0.92 |

TABLE 19

Lens system 510
Fno = 3.2, EFL = 12 mm, FOV = 28.5°, $f_{35\,mm}$ = 84 mm

| Element | Surface (S#) | Radius (mm) | Thickness or separation (mm) | Refractive Index $N_d$ | Abbe Number $V_d$ |
|---|---|---|---|---|---|
| Object | 0 | INF | INF | | |
| Stop | 1 | INF | −0.3526 | | |
| L1 | *2 | 4.7591 | 0.5826 | 1.513 | 56.6 |
| Prism | 3 | INF | 2.1303 | 1.755 | 27.6 |
| | Decenter (1) | | | | |

TABLE 19-continued

Lens system 510
Fno = 3.2, EFL = 12 mm, FOV = 28.5°, $f_{35\ mm}$ = 84 mm

| Element | Surface (S#) | Radius (mm) | Thickness or separation (mm) | | Refractive Index $N_d$ | Abbe Number $V_d$ |
|---|---|---|---|---|---|---|
| Lens 2 | 4 | INF | −2.1303 | REFL | | |
| Bend (1) | | | | | | |
| | 5 | INF | −0.4000 | | | |
| L2 | *6 | 62.3900 | −0.8000 | | 1.651 | 21.5 |
| | *7 | −8.0000 | −2.0287 | | | |
| L3 | *8 | −2.7924 | −1.3100 | | 1.545 | 55.9 |
| | *9 | −3.0772 | −4.2239 | | | |
| IR filter | 10 | INF | −0.2100 | | 1.517 | 64.2 |
| | 11 | INF | −0.1000 | | | |
| Sensor | 12 | INF | 0.0000 | | | |

*Annotates aspheric surfaces (aspheric coefficients given in Table 20)

TABLE 20

Aspheric Coefficients (Lens System 510)

| | Surface (S#) | | | | |
|---|---|---|---|---|---|
| | S2 | S6 | S7 | S8 | S9 |
| K | 0 | 0 | 0 | 0 | 0 |
| A4 | −2.95143E−04 | 6.41822E−03 | 1.24501E−02 | 1.56218E−02 | 1.13647E−02 |
| A6 | −4.15865E−05 | −3.07344E−03 | −4.81181E−03 | 1.95660E−04 | 4.84332E−04 |
| A8 | 0.00000E+00 | 4.98332E−04 | 9.38776E−04 | 4.58619E−05 | 1.97393E−04 |
| A10 | 0.00000E+00 | −2.84778E−05 | −1.63568E−04 | 9.76688E−06 | −7.89325E−05 |
| A12 | 0.00000E+00 | −8.82972E−06 | 1.59358E−05 | −3.11560E−06 | 1.21222E−05 |
| A14 | 0.00000E+00 | 1.63394E−06 | −2.82729E−07 | 4.01709E−07 | −6.35702E−07 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 21

Decentering Constants (Lens System 510)

| Decenter | X | Y | Z | Alpha(deg) | Beta(deg) | Gamma(deg) |
|---|---|---|---|---|---|---|
| D(1) and Bend (1) | 0 | 0 | 0 | 45 | 0 | 0 |

TABLE 22

Optical Definitions (Lens system 510)

| | | | |
|---|---|---|---|
| EFL | 12 mm | $V_1$ | 56.6 |
| FNO | 3.2 | $V_2$ | 21.5 |
| FOV | 28.5° | |f/f1| | 0.74 |
| $f_{35\ mm}$ | 84 mm | |f/f2| | 1.51 |
| Z | 4.85 mm | |R3f/R3r| | 0.91 |

TABLE 23

Lens system 610
Fno = 2.8, EFL = 10 mm, FOV = 28°, $f_{35\ mm}$ = 86 mm

| Element | Surface (S#) | Radius (mm) | Thickness or separation (mm) | | Refractive Index $N_d$ | Abbe Number $V_d$ |
|---|---|---|---|---|---|---|
| Object | 0 | INF | INF | | | |
| Stop | 1 | INF | −0.1000 | | | |
| L1 | *2 | 4.3054 | 0.6229 | | 1.513 | 56.6 |
| Prism | 3 | INF | 2.0641 | | 1.755 | 27.6 |
| Decenter (1) | | | | | | |
| Lens 2 | 4 | INF | −2.0641 | REFL | | |
| Bend (1) | | | | | | |
| | 5 | INF | −0.4000 | | | |
| L2 | *6 | 13.1995 | −1.1000 | | 1.651 | 21.5 |
| | *7 | −10.2750 | −1.4081 | | | |

TABLE 23-continued

Lens system 610
Fno = 2.8, EFL = 10 mm, FOV = 28°, $f_{35\,mm}$ = 86 mm

| Element | Surface (S#) | Radius (mm) | Thickness or separation (mm) | Refractive Index $N_d$ | Abbe Number $V_d$ |
|---|---|---|---|---|---|
| L3 | *8 | −2.3481 | −1.3100 | 1.545 | 55.9 |
|  | *9 | −2.8574 | −3.2429 |  |  |
| IR filter | 10 | INF | −0.2100 | 1.517 | 64.2 |
|  | 11 | INF | −0.1000 |  |  |
| Sensor | 12 | INF | 0.0000 |  |  |

*Annotates aspheric surfaces (aspheric coefficients given in Table 24)

TABLE 24

Aspheric Coefficients (Lens System 610)

| | Surface (S#) | | | | |
|---|---|---|---|---|---|
| | S2 | S6 | S7 | S8 | S9 |
| K | 0 | 0 | 0 | 0 | 0 |
| A4 | −1.67061E−04 | 1.31861E−02 | 2.90682E−02 | 2.93473E−02 | 1.30616E−02 |
| A6 | −1.28950E−05 | −3.36712E−03 | −7.93268E−03 | 1.09078E−03 | 3.83832E−03 |
| A8 | 0.00000E+00 | 2.96525E−04 | 1.72439E−03 | 1.35728E−04 | −2.21086E−04 |
| A10 | 0.00000E+00 | 1.78541E−04 | −2.64817E−04 | 8.13319E−05 | −1.42155E−04 |
| A12 | 0.00000E+00 | −7.05953E−05 | 2.47809E−05 | −2.82860E−05 | 4.12877E−05 |
| A14 | 0.00000E+00 | 8.56770E−06 | −7.05453E−07 | 4.70059E−06 | −3.28441E−06 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 25

Decentering Constants (Lens System 610)

| Decenter | X | Y | Z | Alpha(deg) | Beta(deg) | Gamma(deg) |
|---|---|---|---|---|---|---|
| D(1) and Bend (1) | 0 | 0 | 0 | 45 | 0 | 0 |

TABLE 26

Optical Definitions (Lens system 610)

| | | | |
|---|---|---|---|
| EFL | 10 mm | $V_1$ | 56.6 |
| FNO | 2.8 | $V_2$ | 21.5 |
| FOV | 28° | |f/f1| | 0.68 |
| $f_{35\,mm}$ | 86 mm | |f/f2| | 1.7 |
| Z | 4.75 mm | |R3f/R3r| | 0.82 |

TABLE 27

Lens system 710
Fno = 3.8, EFL = 16 mm, FOV = 17.8°, $f_{35\,mm}$ = 137 mm

| Element | Surface (S#) | Radius (mm) | Thickness or separation (mm) | | Refractive Index $N_d$ | Abbe Number $V_d$ |
|---|---|---|---|---|---|---|
| Object | 0 | INF | INF | | | |
| Stop | 1 | INF | −0.3655 | | | |
| L1 | *2 | 5.5666 | 0.6155 | | 1.513 | 56.6 |
| Prism | 3 | INF | 2.4773 | | 1.755 | 27.6 |
|  | Decenter (1) | | | | | |
| Lens 2 | 4 | INF | −2.4773 | REFL | | |
|  | Bend (1) | | | | | |
|  | 5 | INF | −0.4000 | | | |
| L2 | *6 | 9.4597 | −1.1000 | | 1.651 | 21.5 |
|  | 7 | 57.2358 | −5.0141 | | | |
| L3 | *8 | −3.6676 | −1.3100 | | 1.545 | 55.9 |
|  | *9 | −3.2803 | −4.1430 | | | |
| IR filter | 10 | INF | −0.2100 | | 1.517 | 64.2 |
|  | 11 | INF | −0.1000 | | | |
| Sensor | 12 | INF | 0.0000 | | | |

*Annotates aspheric surfaces (aspheric coefficients given in Table 28)

TABLE 28

Aspheric Coefficients (Lens System 710)

Surface (S#)

| | S2 | S6 | S8 | S9 |
|---|---|---|---|---|
| K | 0 | 0 | 0 | 0 |
| A4 | −7.39550E−07 | 1.88716E−04 | 4.69962E−03 | 5.45999E−03 |
| A6 | 1.21192E−05 | 4.24110E−05 | 9.74285E−04 | 1.50061E−03 |
| A8 | 0.00000E+00 | 2.36650E−06 | −3.07164E−04 | −4.57976E−04 |
| A10 | 0.00000E+00 | 0.00000E+00 | 9.15076E−05 | 1.46920E−04 |
| A12 | 0.00000E+00 | 0.00000E+00 | −1.25986E−05 | −2.23759E−05 |
| A14 | 0.00000E+00 | 8.56770E−06 | 6.90588E−07 | 1.34154E−06 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 29

Decentering Constants (Lens System 710)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 30

Optical Definitions (Lens system 710)

| EFL | 16 mm | $V_1$ | 56.6 |
|---|---|---|---|
| FNO | 3.8 | $V_2$ | 21.5 |
| FOV | 17.8° | $|f/f1|$ | 0.84 |
| $f_{35\,mm}$ | 137 mm | $|f/f2|$ | 1.09 |
| Z | 5.5 mm | $|R3f/R3r|$ | 1.12 |

TABLE 31

Lens system 810
Fno = 3.2, EFL = 14 mm, FOV = 20.1°, $f_{35\,mm}$ = 120 mm

| Element | Surface (S#) | Radius (mm) | Thickness or separation (mm) | Refractive Index $N_d$ | Abbe Number $V_d$ |
|---|---|---|---|---|---|
| Object | 0 | INF | INF | | |
| Stop | 1 | INF | −0.3806 | | |
| L1 | *2 | 6.0162 | 0.6108 | 1.513 | 56.6 |
| Prism | 3 | INF | 2.3889 | 1.755 | 27.6 |
| | Decenter (1) | | | | |
| Lens 2 | 4 | INF | −2.3889 | REFL | |
| | Bend (1) | | | | |
| | 5 | INF | −0.4000 | | |
| L2 | *6 | 10.0838 | −1.5000 | 1.651 | 21.5 |
| | 7 | −41.7944 | −2.9678 | | |
| L3 | *8 | −3.0676 | −2.1000 | 1.545 | 55.9 |
| | *9 | −3.5230 | −4.7965 | | |
| IR filter | 10 | INF | −0.2100 | 1.517 | 64.2 |
| | 11 | INF | −0.1000 | | |
| Sensor | 12 | INF | 0.0000 | | |

*Annotates aspheric surfaces (aspheric coefficients given in Table 32)

TABLE 32

Aspheric Coefficients (Lens System 810)

Surface (S#)

| | S2 | S6 | S8 | S9 |
|---|---|---|---|---|
| K | 0 | 0 | 0 | 0 |
| A4 | −1.37180E−04 | −1.27420E−03 | 2.45927E−03 | −3.53430E−03 |
| A6 | 7.12659E−07 | 6.01099E−05 | 6.23315E−04 | 7.23182E−04 |
| A8 | 0.00000E+00 | 5.40605E−07 | −1.94068E−04 | −3.28264E−04 |
| A10 | 0.00000E+00 | 0.00000E+00 | 5.29622E−05 | 8.55874E−05 |
| A12 | 0.00000E+00 | 0.00000E+00 | −6.33171E−06 | −9.64805E−06 |
| A14 | 0.00000E+00 | 0.00000E+00 | 3.40851E−07 | 4.35434E−07 |
| A16 | 0.00000E+00 | 0.00000E+00 | 0.00000E+00 | 0.00000E+00 |

TABLE 32-continued

Aspheric Coefficients (Lens System 810)

| | Surface (S#) | | | |
|---|---|---|---|---|
| | S2 | S6 | S8 | S9 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 33

Decentering Constants (Lens System 810)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 34

Optical Definitions (Lens system 810)

| | | | |
|---|---|---|---|
| EFL | 14 mm | $V_1$ | 56.6 |
| FNO | 3.2 | $V_2$ | 21.5 |
| FOV | 20.1° | |f/f1| | 0.77 |
| $f_{35\,mm}$ | 120 mm | |f/f2| | 1.48 |
| Z | 5.4 mm | |R3f/R3r| | 0.87 |

TABLE 35

Lens system 910
Fno = 3.0, EFL = 12 mm, FOV = 23.5°, $f_{35\,mm}$ = 103 mm

| Element | Surface (S#) | Radius (mm) | Thickness or separation (mm) | Refractive Index $N_d$ | Abbe Number $V_d$ |
|---|---|---|---|---|---|
| Object | 0 | INF | INF | | |
| Stop | 1 | INF | −0.4129 | | |
| L1 | *2 | 6.0162 | 0.6429 | 1.513 | 56.6 |
| Prism | 3 | INF | 2.2006 | 1.755 | 27.6 |
| | Decenter (1) | | | | |
| Lens 2 | 4 | INF | −2.2006 | REFL | |
| | Bend (1) | | | | |
| | 5 | INF | −0.4000 | | |
| L2 | *6 | 9.7361 | −1.1000 | 1.651 | 21.5 |
| | *7 | −22.7209 | −1.6487 | | |
| L3 | *8 | −2.5469 | −1.3100 | 1.545 | 55.9 |
| | *9 | −2.7328 | −4.2993 | | |
| IR filter | 10 | INF | −0.2100 | 1.517 | 64.2 |
| | 11 | INF | −0.1000 | | |
| Sensor | 12 | INF | 0.0000 | | |

*Annotates aspheric surfaces (aspheric coefficients given in Table 36)

TABLE 36

Aspheric Coefficients (Lens System 910)

| | Surface (S#) | | | |
|---|---|---|---|---|
| | S2 | S6 | S8 | S9 |
| K | 0 | 0 | 0 | 0 |
| A4 | −1.63365E−04 | 6.58456E−03 | 1.70894E−02 | 2.48425E−02 |
| A6 | −2.42913E−05 | −2.57282E−03 | −5.08885E−03 | 3.99244E−04 |
| A8 | 0.00000E+00 | 3.78108E−04 | 9.27077E−04 | 4.41383E−05 |
| A10 | 0.00000E+00 | −1.20871E−05 | −1.23550E−04 | 2.69972E−05 |
| A12 | 0.00000E+00 | −9.72383E−06 | 6.20626E−06 | −1.02741E−05 |
| A14 | 0.00000E+00 | 1.96232E−06 | 8.41423E−07 | 1.93889E−06 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 37

Decentering Constants (Lens System 910)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 38

Optical Definitions (Lens system 910)

| | | | |
|---|---|---|---|
| EFL | 12 mm | $V_1$ | 56.6 |
| FNO | 3.0 | $V_2$ | 21.5 |
| FOV | 23.5° | $|f/f1|$ | 0.74 |
| $f_{35\ mm}$ | 103 mm | $|f/f2|$ | 1.58 |
| Z | 5.45 mm | $|R3f/R3r|$ | 0.93 |

Example Flowchart

Figure 11:
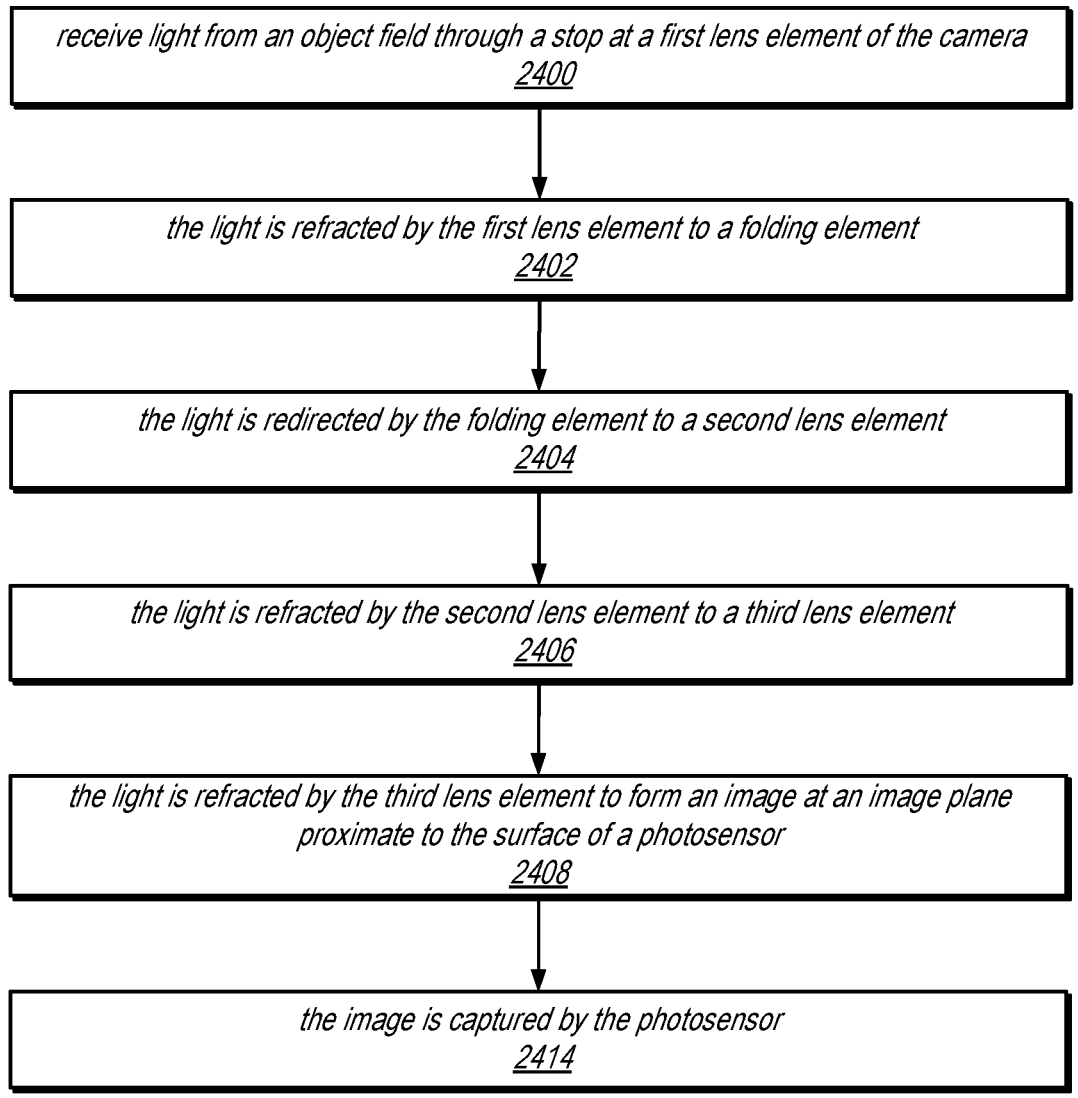
FIG. 11 is a flowchart of a method for capturing images using cameras with lens systems as illustrated FIGS. 1 through 10B, according to some embodiments.

FIG. 11 is a high-level flowchart of a method for capturing images using a camera with a lens system that includes three lens elements and a folding element as illustrated in FIGS. 1 through 10B, according to some embodiments. As indicated at 2400, light from an object field in front of the camera is received at a first lens element of the camera through an aperture stop. In some embodiments, the aperture stop may be located at the first lens element and behind the front vertex of the lens system. As indicated at 2402, the first lens element refracts the light on a first axis AX1 to a light folding element such as a prism. As indicated at 2404, the light is redirected by the folding element to a second lens element on a second axis AX2. As indicated at 2406, the light is then refracted by the second lens element to a third lens element on the second axis AX2. As indicated at 2408, the light is then refracted by the third lens element to form an image at an image plane at or near the surface of a photosensor. As indicated at 2414, the image is captured by the photosensor. While not shown, in some embodiments, the light may pass through an infrared filter that may for example be located between the third lens element and the photosensor.

In some embodiments, the elements referred to in FIG. 11 may be configured as illustrated in any of FIGS. 1 through 10B. However, note that variations on the example as given in the Figures are possible while achieving similar optical results.

Example Computing Device

FIG. 12 illustrates an example computing device, referred to as computer system 4000, that may include or host embodiments of the camera as illustrated in FIGS. 1 through 11. In addition, computer system 4000 may implement methods for controlling operations of the camera and/or for performing image processing of images captured with the camera. In different embodiments, computer system 4000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a mobile multipurpose device, a wireless phone, a smartphone, a consumer device, video game console, handheld video game device, application server, storage device, a television, a video recording device, or in general any type of computing or electronic device.

In the illustrated embodiment, computer system 4000 includes one or more processors 4010 coupled to a system memory 4020 via an input/output (I/O) interface 4030. Computer system 4000 further includes a network interface 4040 coupled to I/O interface 4030, and one or more input/output devices 4050, such as cursor control device 4060, keyboard 4070, and display(s) 4080. Computer system 4000 may also include one or more cameras 4090, for example one or more cameras as described above with respect to FIGS. 1 through 11, which may also be coupled to I/O interface 4030, or one or more cameras as described above with respect to FIGS. 1 through 11 along with one or more other cameras such as wide-field cameras.

In various embodiments, computer system 4000 may be a uniprocessor system including one processor 4010, or a multiprocessor system including several processors 4010 (e.g., two, four, eight, or another suitable number). Processors 4010 may be any suitable processor capable of executing instructions. For example, in various embodiments processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

System memory 4020 may be configured to store program instructions 4022 and/or data 4032 accessible by processor 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions 4022 may be configured to implement various interfaces, methods and/or data for controlling operations of camera 4090 and for capturing and processing images with integrated camera 4090 or other methods or data, for example interfaces and methods for capturing, displaying, processing, and storing images captured with camera 4090. In some embodiments, program instructions and/or data may be received, sent or stored upon different types of computer-accessible media or on similar media separate from system memory 4020 or computer system 4000.

In one embodiment, I/O interface 4030 may be configured to coordinate I/O traffic between processor 4010, system memory 4020, and any peripheral devices in the device, including network interface 4040 or other peripheral interfaces, such as input/output devices 4050. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. Also, in some embodiments some or all of the functionality of I/O interface 4030, such as an interface to system memory 4020, may be incorporated directly into processor 4010.

Network interface 4040 may be configured to allow data to be exchanged between computer system 4000 and other devices attached to a network 4085 (e.g., carrier or agent devices) or between nodes of computer system 4000. Network 4085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 4040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 4050 may, in some embodiments, include one or more display terminals, keyboards, keypads, touchpads, scanning devices, voice or optical recognition devices, or any other devices suitable for entering or accessing data by computer system 4000. Multiple input/output devices 4050 may be present in computer system 4000 or may be distributed on various nodes of computer system 4000. In some embodiments, similar input/output devices may be separate from computer system 4000 and may interact with one or more nodes of computer system 4000 through a wired or wireless connection, such as over network interface 4040.

As shown in FIG. 12, memory 4020 may include program instructions 4022, which may be processor-executable to implement any element or action to support integrated camera 4090, including but not limited to image processing software and interface software for controlling camera 4090. In some embodiments, images captured by camera 4090 may be stored to memory 4020. In addition, metadata for images captured by camera 4090 may be stored to memory 4020.

Those skilled in the art will appreciate that computer system 4000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 4000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 4000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 4000 may be transmitted to computer system 4000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
three refractive lens elements arranged along a folded optical axis from an object side of the lens system to an image side of the lens system and a light folding element located between a first and second lens element from the object side and configured to redirect light from a first axis onto a second axis;
wherein the lens system is configured to refract light from an object field on the object side of the lens system to form an image of a scene at an image plane on the image side of the lens system; and
wherein an effective focal length of the three lens elements and the light folding element is within a range of 10 millimeters to 16 millimeters.

2. The lens system as recited in claim 1, wherein the lens system provides a 35 mm equivalent focal length in a range of 80-200 millimeters.

3. The lens system as recited in claim 1, wherein Z-height of the lens system measured from a front vertex of the lens system to a rear vertex of the folding element is 6.5 millimeters or less.

4. The lens system as recited in claim 1, wherein the lens system comprises, arranged along the folded optical axis from the object side of the lens system to the image side of the lens system:
the first lens element on the first axis having positive refractive power and a convex object-side surface in a paraxial region;
the light folding element configured to redirect light from the first lens element to the second axis;

the second lens element on the second axis; and a third lens element on the second axis having a concave image-side surface in a paraxial region.

5. The lens system as recited in claim 4, wherein the second lens element has negative refractive power.

6. The lens system as recited in claim 4, wherein the third lens element has a convex object-side surface in the paraxial region.

7. The lens system as recited in claim 4, wherein the first lens element is formed of an optical material with Abbe number Vd>45, and the second lens element is formed of an optical material with Abbe number Vd<35.

8. The lens system as recited in claim 4, the first lens element is formed of an optical material with Abbe number Vd>40, and the second lens element is formed of an optical material with Abbe number Vd<30.

9. The lens system as recited in claim 4, the lens system satisfies one or more of the relationships:

$$0.5 < |f/f1| < 2,$$

$$0.4 < |f/f2| < 2.5, \text{ or}$$

$$0.5 < |R3f/R3r| < 1.5$$

where f is effective focal length of the lens system, f1 is focal length of the first lens element, f2 is focal length of the second lens element, R3f is radius of curvature of the object-side surface of the third lens element, and R3r is radius of curvature of the image side surface of the third lens element.

10. The lens system as recited in claim 1, wherein the lens system further comprises an aperture stop located between the object side of the lens system and the light folding element.

11. The lens system as recited in claim 1, wherein at least one surface of at least one of the three refractive lens elements is aspheric.

12. The lens system as recited in claim 1, wherein at least one of the lens elements is formed of lightweight polymer or plastic material.

13. The lens system as recited in claim 1, wherein the light folding element is a prism.

14. The lens system as recited in claim 13, wherein an image side surface of the first lens element is flat/plano, and wherein the image side surface of the first lens element is in contact with the object side surface of the prism.

15. The lens system as recited in claim 13, wherein an image side surface of the first lens element is convex, concave, or flat/plano, and wherein the image side surface of the first lens element is not in contact with the object side surface of the prism.

16. A camera, comprising:

a photosensor configured to capture light projected onto a surface of the photosensor; and a folded lens system configured to refract light from an object field located in front of the camera to form an image of a scene at an image plane at or near the surface of the photosensor, wherein the lens system comprises three refractive lens elements arranged along a folded optical axis of the camera from an object side to an image side and a light folding element located between a first and second lens element of the three refractive lens elements from the object side and configured to redirect light from a first axis onto a second axis;

wherein an effective focal length of the three lens elements and the light folding element is within a range of 10 millimeters to 16 millimeters.

17. The camera as recited in claim 16, wherein the folded lens system provides a 35 mm equivalent focal length in the range of 85-200 millimeters and less than 6 millimeters of Z-height measured from a front vertex of the lens system to a rear vertex of the folding element.

18. The camera as recited in claim 16, wherein the photosensor is between 4 millimeters and 8 millimeters in a diagonal dimension.

19. The camera as recited in claim 16, wherein the photosensor is configured to move on one or more axes relative to the lens system to adjust focus of the camera.

20. A device, comprising:

one or more processors;

one or more cameras; and a memory comprising program instructions executable by at least one of the one or more processors to control operations of the one or more cameras;

wherein at least one of the one or more cameras is a camera comprising:

a photosensor configured to capture light projected onto a surface of the photosensor;

a folded lens system configured to refract light from an object field located in front of the camera to form an image of a scene at an image plane proximate to the surface of the photosensor, wherein the lens system comprises three refractive lens elements arranged along a folded optical axis of the lens system from an object side to an image side and a light folding element configured to redirect light from a first lens element of the three refractive lens elements on the object side to a second portion of the folded optical axis; and at least one aperture stop located between a front vertex of the lens system and the light folding element;

wherein effective focal length of the folded lens system is within a range of 10 millimeters to 16 millimeters.

* * * * *